United States Patent
Arora et al.

(10) Patent No.: US 11,900,382 B2
(45) Date of Patent: Feb. 13, 2024

(54) METHOD AND SYSTEM FOR DETECTING FRAUDULENT TRANSACTIONS

(71) Applicant: MASTERCARD INTERNATIONAL INCORPORATED, Purchase, NY (US)

(72) Inventors: Ankur Arora, New Delhi (IN); Vikas Bishnoi, Jodhpur (IN); Gaurav Dhama, Gurgaon (IN); Hardik Wadhwa, Bangalore (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 42 days.

(21) Appl. No.: 17/477,481

(22) Filed: Sep. 16, 2021

(65) Prior Publication Data

US 2022/0101327 A1 Mar. 31, 2022

(30) Foreign Application Priority Data

Sep. 29, 2020 (IN) .............................. 202021042335

(51) Int. Cl.
*G06Q 20/40* (2012.01)
*G06N 3/08* (2023.01)

(52) U.S. Cl.
CPC .......... *G06Q 20/4016* (2013.01); *G06N 3/08* (2013.01)

(58) Field of Classification Search
CPC ................................................ G06Q 20/4016
See application file for complete search history.

(56) References Cited

U.S. PATENT DOCUMENTS

| 10,339,606 B2 | 7/2019 | Gupta et al. |
| 2014/0214671 A1* | 7/2014 | Desilva .............. G06Q 20/4016 705/44 |

(Continued)

FOREIGN PATENT DOCUMENTS

| CN | 109118053 | 1/2019 | |
| CN | 109118053 A * | 1/2019 | ......... G06Q 10/0635 |

(Continued)

OTHER PUBLICATIONS

"Cheng et al. Graph Neural Network for Fraud Detection via Spatial-Temporal Attention, Sep. 23, 2020, IEEE, entire document" (Year: 2020).*

(Continued)

*Primary Examiner* — Hani M Kazimi
*Assistant Examiner* — Adam Hilmantel
(74) *Attorney, Agent, or Firm* — Pillsbury Winthrop Shaw Pittman LLP

(57) ABSTRACT

A method for detecting fraudulent transactions includes generation of a graph including a plurality of nodes and a plurality edges between the plurality of nodes based on historical transaction data of a plurality of historical transactions. The plurality of nodes include a set of merchant nodes and a set of consumer nodes. A set of static features and a plurality of dynamic features are determined based on the historical transaction data and the generated graph, respectively. A neural network is trained based on the set of static features and the plurality of dynamic features for detection of transaction fraud. The neural network is used to detect a first transaction as one of a fraudulent transaction or a legitimate transaction based on first transaction data of the first transaction.

20 Claims, 22 Drawing Sheets

(56) References Cited

U.S. PATENT DOCUMENTS

| | | | |
|---|---|---|---|
| 2017/0053294 A1* | 2/2017 | Yang | G06Q 20/4016 |
| 2019/0378010 A1* | 12/2019 | Morris | G06N 3/04 |
| 2020/0097817 A1* | 3/2020 | Harris | G06N 3/04 |
| 2020/0167785 A1* | 5/2020 | Kursun | H04L 43/045 |
| 2021/0209604 A1* | 7/2021 | Wang | G06F 21/552 |
| 2022/0038534 A1* | 2/2022 | Saraf | G06V 20/58 |
| 2022/0044244 A1* | 2/2022 | Chen | G06F 16/285 |

FOREIGN PATENT DOCUMENTS

| | | | | |
|---|---|---|---|---|
| EP | 3574462 | | 12/2019 | |
| WO | WO-2007041709 A1 * | 4/2007 | | G06Q 10/067 |
| WO | WO-2020014425 A1 * | 1/2020 | | G06F 21/6245 |

OTHER PUBLICATIONS

European Extended Search Report issued in corresponding International Application No. 21195409.4, dated Feb. 16, 2022.

\* cited by examiner

| | 308a | 308b | 308c | 308d | 308h | 308i |
|---|---|---|---|---|---|---|
| | 0.5 | 0.5 | 0.4 | 0.0 | 0.0 | 0.1 |
| | 0.4 | 0.3 | 0.4 | -0.6 | -0.7 | -0.7 |
| | -0.1 | -0.1 | -0.5 | 0.9 | 0.9 | 0.3 |
| | -0.7 | -0.7 | -0.7 | -0.7 | -0.6 | 0.6 |
| | 0.9 | 0.8 | 0.9 | 0.9 | 0.9 | 0.9 |
| | 0.0 | 0.1 | 0.7 | -0.6 | -0.6 | -0.6 |
| | 0.2 | 0.2 | 0.2 | 0.0 | 0.1 | 0.3 |
| | -0.8 | -0.8 | -0.6 | 0.9 | 0.8 | 0.8 |
| | $N_{M1}$ | $N_{M2}$ | $N_{M3}$ | $N_{C1}$ | $CL_1$ | $CL_2$ |

FIG. 3B

METHOD AND SYSTEM FOR DETECTING FRAUDULENT TRANSACTIONS

RELATED APPLICATIONS

This application claims priority to Indian Application Serial No. 202021042335, filed Sep. 29, 2020, which is incorporated herein by reference in its entirety.

FIELD OF THE DISCLOSURE

Various embodiments of the present disclosure relate generally to fraud detection. More particularly, various embodiments of the present disclosure relate to method and system for detecting fraudulent transactions.

BACKGROUND

Technological advancements have led to the development of transaction systems that allow consumers to perform cashless electronic transactions, such as deposits and withdrawals, credit transfers, purchase payments, or the like. Such transaction systems enable transactions by means of various payment modes such as transaction cards, digital wallets, netbanking, unified payment interfaces (UPIs), or the like. Use of these payment modes has increased the ease with which consumers perform transactions, resulting in an exponential growth in the number of electronic transactions.

The increase in the number of electronic transactions has been accompanied by a significant increase in fraudulent transactions. For example, consumers with malicious intent use nefarious methods such as phishing, stealing transaction cards, or conducting man-in-the-middle-attacks, to obtain credentials of payment modes of others consumers, and perform unauthorized transactions. As a result of fraudulent transactions, the transacting parties (such as consumers, merchants, acquirers, payment networks, and issuers) incur substantial monetary losses, which is undesirable.

For mitigating fraudulent transactions, modern day transaction systems have come to rely on artificial intelligence (e.g., machine learning) models. An artificial intelligence model employs a learning algorithm for evaluating transaction data over time, identifying various fraud patterns in the transaction data, and detecting fraudulent transactions. For detection of fraudulent transactions, such artificial intelligence models typically use static features (such as transaction amounts, geo-locations corresponding to transactions, or the like) extracted from the transaction data. However, these static features fail to capture complex interdependencies in the transaction data, for example, dependencies among consumers and merchants. Due to the failure in capturing such complex interdependencies, accuracy and efficacy of these artificial intelligence models is not adequate.

In light of the foregoing, there is a need for a technical solution that solves the abovementioned problems and captures complex interdependencies in transaction data for accurate detection of fraudulent transactions.

SUMMARY

In an embodiment of the present disclosure, a method for detecting fraudulent transactions is provided. The method includes generation of a graph that includes a plurality of nodes and a plurality edges between the plurality of nodes by a server, based on historical transaction data of a plurality of historical transactions. Each historical transaction of the plurality of historical transactions is executed between a consumer of a set of consumers and a merchant of a set of merchants. The plurality of nodes include a set of merchant nodes corresponding to the set of merchants and a set of consumer nodes corresponding to the set of consumers. A set of static features is determined based on the historical transaction data and a plurality of dynamic features are determined based on the generated graph by the server. A neural network is trained by the server based on the set of static features and the plurality of dynamic features, for detection of transaction fraud. The trained neural network is used to detect a first transaction as one of a fraudulent transaction or a legitimate transaction based on first transaction data of the first transaction.

In another embodiment of the present disclosure, a method for detecting fraudulent transactions is provided. The method includes reception of first transaction data of a first transaction by a server. The first transaction data is provided as input to a neural network that is trained based on a set of static features and a plurality of dynamic features. The set of static features is determined based on historical transaction data of a plurality of historical transactions and the plurality of dynamic features are determined based on a graph that includes a plurality of nodes and a plurality weighted edges between the plurality of nodes. The plurality of nodes include a set of merchant nodes corresponding to a set of merchants in the plurality of historical transactions and a set of consumer nodes corresponding to a set of consumers in the plurality of historical transactions. The first transaction is detected as one of a fraudulent transaction or a legitimate transaction based on an output of the trained neural network for the inputted first transaction data.

In another embodiment of the present disclosure, a system for detecting fraudulent transactions is provided. The system includes a server that is configured to generate a graph that includes a plurality of nodes and a plurality edges between the plurality of nodes, based on historical transaction data of a plurality of historical transactions. Each historical transaction of the plurality of historical transactions is executed between a consumer of a set of consumers and a merchant of a set of merchants. The plurality of nodes include a set of merchant nodes corresponding to the set of merchants and a set of consumer nodes corresponding to the set of consumers. The server is configured to determine a set of static features based on the historical transaction data and a plurality of dynamic features based on the generated graph. The server is further configured to train a neural network based on the set of static features and the plurality of dynamic features, for detection of transaction fraud. The trained neural network is used to detect a first transaction as one of a fraudulent transaction or a legitimate transaction based on first transaction data of the first transaction.

BRIEF DESCRIPTION OF DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIGS. 3A and 3B are schematic diagrams that collectively illustrate an scenario for determination of a plurality of dynamic features by the fraud detection server, in accordance with an embodiment of the present disclosure;

Figure 1A:
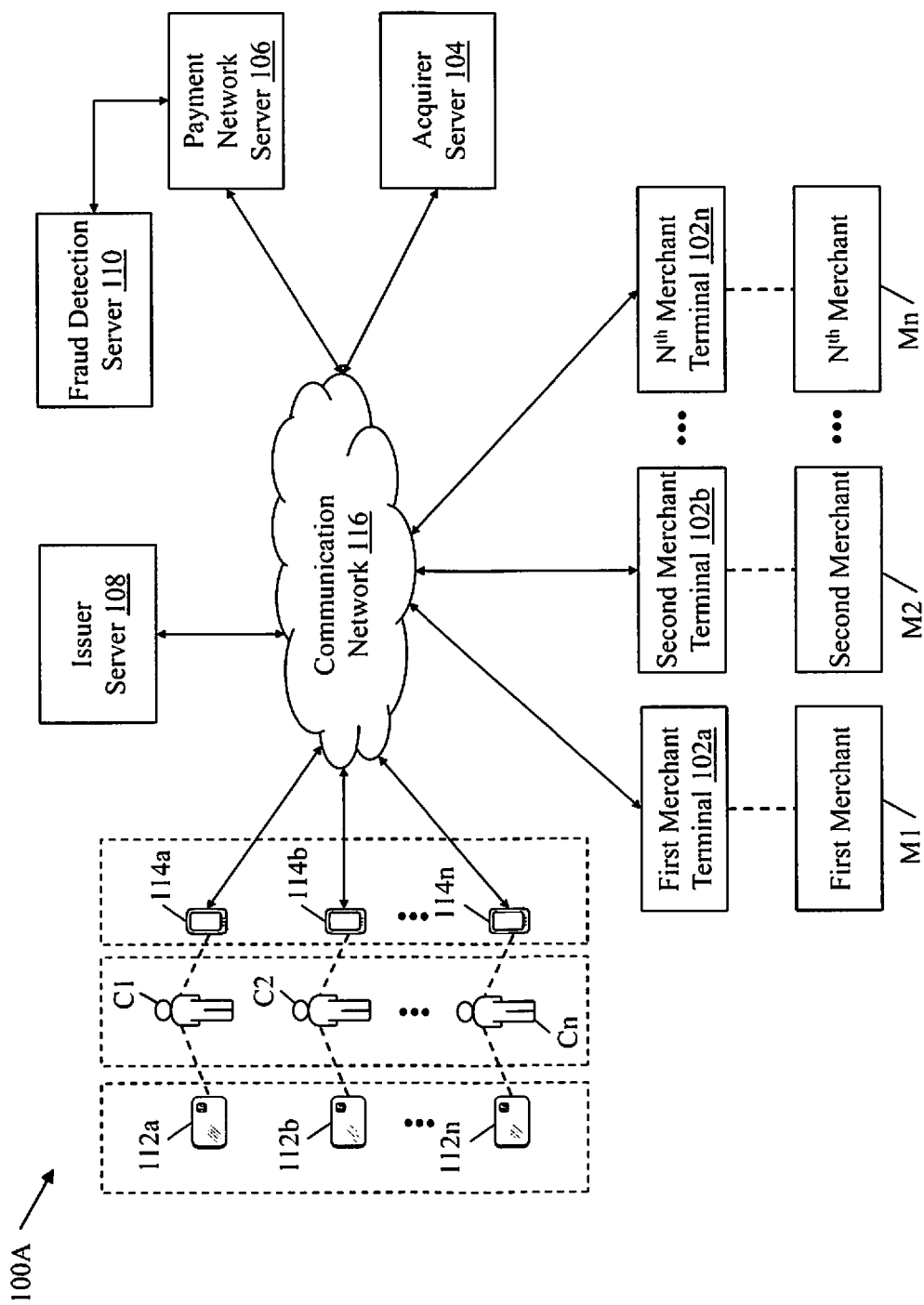
FIG. 1A is a block diagram that illustrates an environment for detecting fraudulent transactions, in accordance with an embodiment of the present disclosure.

Further areas of applicability of the present disclosure will become apparent from the detailed description provided hereinafter. It should be understood that the detailed description of embodiments is intended for illustration purposes only and is, therefore, not intended to necessarily limit the scope of the present disclosure.

DETAILED DESCRIPTION OF EMBODIMENTS

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

These days transaction systems mostly rely on artificial intelligence (e.g., machine learning) models to mitigate fraud in financial transactions. Typically, the artificial intelligence models use static features extracted from the transaction data for detecting fraudulent transactions. However, the static features fail to adequately capture complex inter-dependencies in the transaction data, for example, dependencies among consumers and merchants, that reflect fraudulent transactions, thus, resulting in low accuracy, which is undesirable.

Various embodiments of the present disclosure provide a method and a system that solve the abovementioned problems by detecting fraudulent transactions. The system includes a server (e.g., a fraud detection server, an issuer server, or a payment network server) that generates a graph (i.e., a consumer-merchant graph) based on historical transaction data of a plurality of historical transactions executed between various consumers and merchants. The graph includes a plurality of nodes and a plurality weighted edges connecting the plurality of nodes. The plurality of nodes include various merchant and consumer nodes corresponding to the merchants and consumers in the plurality of historical transactions, respectively. A weight of an edge connecting two consumer nodes in the graph is indicative of a count of merchants common to the consumers that correspond to the two consumer nodes. A weight of an edge connecting two merchant nodes in the graph is indicative of a count of consumers common to the merchants that correspond to the two merchant nodes. A weight of an edge between a consumer node and a merchant node in the graph is indicative of a count of historical transactions executed between the corresponding consumer and the merchant. The server classifies the plurality of nodes in the graph into a set of clusters based on a degree of similarity among the plurality of nodes. In other words, those nodes that are similar to each other are classified in the same cluster. The server then determines static features based on the historical transaction data and dynamic features based on the clustered graph. The dynamic features include a plurality of embeddings of the plurality of nodes and the set of clusters. Each embedding is a vector that represents one of a node or a cluster as a point in a d-dimensional embedding space. Using the static and dynamic features, the server trains a neural network for detecting fraudulent transactions. When new transaction data is received for a new transaction, the server detects the new transaction as one of a fraudulent transaction or a legitimate transaction based on an output of the trained neural network for the inputted new transaction data. The server further identifies a cluster in the set of clusters that corresponds to the new transaction based on the reception of the transaction data of the new transaction and updates the identified cluster to reflect the new transaction data. Updating the identified cluster includes at least one of: addition of a new consumer node to the identified cluster, addition of a new merchant node to the identified cluster, formation of one or more new edges between two or more existing nodes of the identified cluster, or modification in weights of one or more existing edges in the identified cluster. The server further updates the dynamic features based on the update in the identified cluster. Updating the dynamic features includes adding new dynamic features corresponding to the new merchant node or the new consumer node added to the identified cluster. Updating the dynamic features further includes modifying one or more existing dynamic features corresponding to the identified cluster due to the formation of new edges in the identified cluster or the modification in the weight of existing edges in the identified cluster. The neural network is re-trained by the server based on the updated dynamic features and one or more other updates in the static features.

Thus, the present disclosure utilizes the dynamic features along with the static features for detecting fraudulent transactions. Since the dynamic features are determined based on a consumer-merchant graph, the dynamic features capture consumer-merchant dependencies. Hence, the neural network trained as per the present disclosure is capable of leveraging the consumer-merchant dependencies to detect real-time or near real-time fraudulent transactions with high precision and accuracy.

Terms Description (in Addition to Plain and Dictionary Meaning)

Transaction is an exchange of funds between two or more parties. For example, the transaction may include transferring a transaction amount from a consumer account to a merchant account, when a consumer purchases a product or a service from a merchant. The transaction is performed at one of a merchant terminal or a consumer device. Historical transactions include electronic transactions executed between various merchants and consumers in the past. A real-time transaction refers to a transaction that is currently being executed between a merchant and a consumer.

Historical transaction data refers to transaction data of various historical transactions. The historical transaction data includes various transaction messages exchanged between various parties involved in the historical transactions, such as transaction messages indicating whether a historical transaction was approved, declined, or declared fraudulent.

Graph refers to a graphical data structure that includes multiple nodes connected by way of edges. An edge between any two nodes denotes an association between those two nodes. The graph is generated based on historical transaction data of a plurality of historical transactions executed between various consumers and merchants. Each node in the graph corresponds either to a merchant or to a consumer referenced in the historical transaction data. A weight of an edge between two consumer nodes in the graph is indicative of a count of merchants common to the two consumers that correspond to the two consumer nodes. A weight of an edge between two merchant nodes in the graph is indicative of a count of consumers common to the two merchants that correspond to the two merchant nodes. A weight of an edge between a consumer node and a merchant node in the graph is indicative of a count of historical transactions executed between the consumer-merchant pair that correspond to the consumer node and the merchant node. In one example, the edges that connect the merchant nodes to the consumer nodes are multi-variate edges that further indicate a count of approved historical transactions and a count of declined historical transactions between corresponding consumer-merchant pairs.

Set of clusters includes various sub-graphs obtained by clustering (or segmenting) a graph. Each cluster includes those nodes of the graph that are similar to each other. For example, if a node A is similar to a node B and different from a node C, the nodes A and B are placed in the same cluster and the node C is placed in a different cluster.

Static features include features that indicate legitimacy of a transaction. Static features of historical transactions may be derived from transaction data associated with the historical transactions. Examples of such static features may include a transaction amount feature, a transaction type feature, a merchant category code feature, an acquirer identifier feature, a merchant identifier feature, a transaction category code feature, a transaction currency code feature, a geo-location feature, or the like.

Graph embedding is a technique that allows representation of a graph to a d-dimensional vector that captures key features of the graph while reducing the dimensionality. Graph embedding approach may be applied on various sub-graphs in the graph or nodes in the graph.

Plurality of dynamic features include a plurality of embeddings that represent various nodes and clusters of a graph as points in d-dimensional embedding space. For example, a dynamic feature associated with a node represents the node as a d-dimensional vector that captures the information and attributes of the node. Similarly, a dynamic feature associated with a cluster represents the cluster as a d-dimensional vector that captures the information and attributes of the cluster. The plurality of dynamic features are determined by implementing a graph embedding technique on a consumer-merchant graph.

Neural network refers to a statistical model that is trained to detect fraudulent electronic transactions. The neural network is trained using static and dynamic features. Static features are determined based on historical transaction data, while dynamic features are determined based on a consumer-merchant graph. Post training, the trained neural network is configured to detect whether a real-time transaction or a near real-time transaction is fraudulent. Examples of the neural network may include a convolution neural network (CNN), a deep neural network (DNN), a recurrent neural network (RNN) such as Long Short Term Memory networks (LSTM) networks, or an artificial neural network that may be a combination of the RNN and CNN networks.

A server is a physical or cloud data processing system on which a server program runs. The server may be implemented as hardware or software, or a combination thereof. The server may correspond to one of a payment network server, an issuer server, an acquirer server, or a fraud detection server. The server executes various programs required for detecting fraudulent transactions.

FIG. 1A is a block diagram that illustrates an environment 100A for detecting fraudulent transactions, in accordance with an embodiment of the present disclosure. The environment 100A includes a set of merchant terminals 102a-102n corresponding to a set of merchants M1-Mn, an acquirer server 104, a payment network server 106, an issuer server 108, and a fraud detection server 110. The environment 100A further includes a set of consumers C1-Cn having transaction cards 112a-112n and consumer devices 114a-114n, respectively. The set of merchant terminals 102a-102n, the acquirer server 104, the payment network server 106, the issuer server 108, the fraud detection server 110, and the consumer devices 114a-114n may communicate with each other by way of a communication network 116 or through separate communication networks established therebetween. Hereinafter, the set of merchant terminals 102a-102n, the set of merchants M1-Mn, and the set of consumers C1-Cn are interchangeably referred to as "the merchant terminals 102a-102n", "the merchants M1-Mn", and the "the consumers C1-Cn", respectively.

The merchant terminals 102a-102n are associated with the merchants M1-Mn, respectively. Each merchant terminal 102a-102n includes suitable logic, circuitry, interface, and code, executable by the circuitry, to enable the consumers C1-Cn to perform electronic transactions for purchasing various goods and/or services from the merchants M1-Mn. Each merchant terminal 102a-102n is associated with a unique merchant identifier (MID). The MID is an alphanumeric code, or any other suitable identifier, that is specific to a merchant and uniquely identifies the merchant in a transaction. In one embodiment, the merchant terminals 102a-102n are physical terminal devices of the respective merchants M1-Mn, enabling the consumers C1-Cn to use their respective transaction cards 112a-112n (e.g., debit cards, credit cards, pre-paid cards or the like) for performing the transactions. Examples of the merchant terminals 102a-102n may include Point-of-Sale (POS) devices, Point-of-Purchase (POP) devices, Point-of-Interaction (POI) devices, or the like. In another embodiment, the merchant terminals 102a-102n host web applications or mobile applications (i.e., online stores) of the merchants M1-Mn, accessible to the consumers C1-Cn through their respective consumer devices 114a-114n (e.g., smartphones, laptops, tablets, phablets, or the like) for purchasing goods and/or services from the merchants M1-Mn. In other words, the mobile applications allow the consumers C1-Cn to execute transactions for purchasing the goods and/or services.

The acquirer server 104 is a server arrangement which includes suitable logic, circuitry, interface, and/or code, executable by the circuitry, for processing transactions initiated at the merchant terminals 102a-102n. The acquirer server 104 is operated by the acquirer associated with the merchant terminals 102a-102n. The acquirer is a financial institution that manages payment accounts of the merchants M1-Mn. Details of the payment accounts established with the acquirer are stored as merchant account profiles. Each merchant account profile is indicative of a transaction history of a corresponding merchant, merchant terminal details of the corresponding merchant, or the like. The acquirer server 104 credits, debits, or modifies the payment accounts of the merchants M1-Mn based on the processing of the transactions initiated at the merchant terminals 102a-102n. The acquirer server 104 communicates with the payment network server 106 and the issuer server 108 via the communication network 116 for processing the transactions. It will be apparent to a person of ordinary skill in the art that the merchants M1-Mn may have their payment accounts maintained at different acquirers; however, for the sake of brevity only one acquirer that maintains the payment accounts of the merchants M1-Mn is shown.

The payment network server 106 is a server arrangement which includes suitable logic, circuitry, interface, and code, executable by the circuitry, for processing transactions that are performed using the transaction cards 112a-112n. The payment network server 106 is operated by a payment network (i.e., a payment interchange). The payment network server 106 represents an intermediate entity between the acquirer server 104 and the issuer server 108 for processing the transactions.

The payment network server 106 is configured to maintain a transaction history database that stores historical transaction data of historical transactions executed between the merchants M1-Mn and the consumers C1-Cn. Transaction data of a transaction may include various attributes, such as an amount of the transaction, a timestamp of the transaction, a geo-location of the transaction, a type of the transaction, a merchant category code, an MID, a transaction category code, a transaction currency code, or the like, associated with the transaction. The payment network server 106 continuously updates the transaction history database based on new transactions being executed between the merchants M1-Mn and the consumers C1-Cn. In one embodiment, the payment network server 106 is configured to decline a transaction that is detected as fraudulent.

The issuer server 108 is a server arrangement which includes suitable logic, circuitry, interface, and code, executable by the circuitry, for processing various transactions. The issuer server 108 is operated by the issuer of the transaction cards 112a-112n. The issuer is a financial institution that manages payment accounts of the consumers C1-Cn. Details of the payment accounts established with the issuer are stored as consumer account profiles. Each consumer account profile may be indicative of a transaction history of a corresponding consumer, transaction card details of one or more transaction cards issued to the corresponding consumer, or the like. The issuer server 108 is configured to process transactions for approval or decline. The issuer server 108 further credits, debits, or modifies the payment accounts of the consumers C1-Cn based on the processing of the transactions. Methods of processing the transactions via the issuer server 108 will be apparent to persons of ordinary skill in the art and may include processing a transaction via the traditional four-party system or three-party system. It will be apparent to a person of ordinary skill in the art that the consumers C1-Cn may have their payment accounts maintained at different issuers; however, for the sake of brevity only one issuer that maintains the payment accounts of the consumers C1-Cn is shown.

Figure 2A:
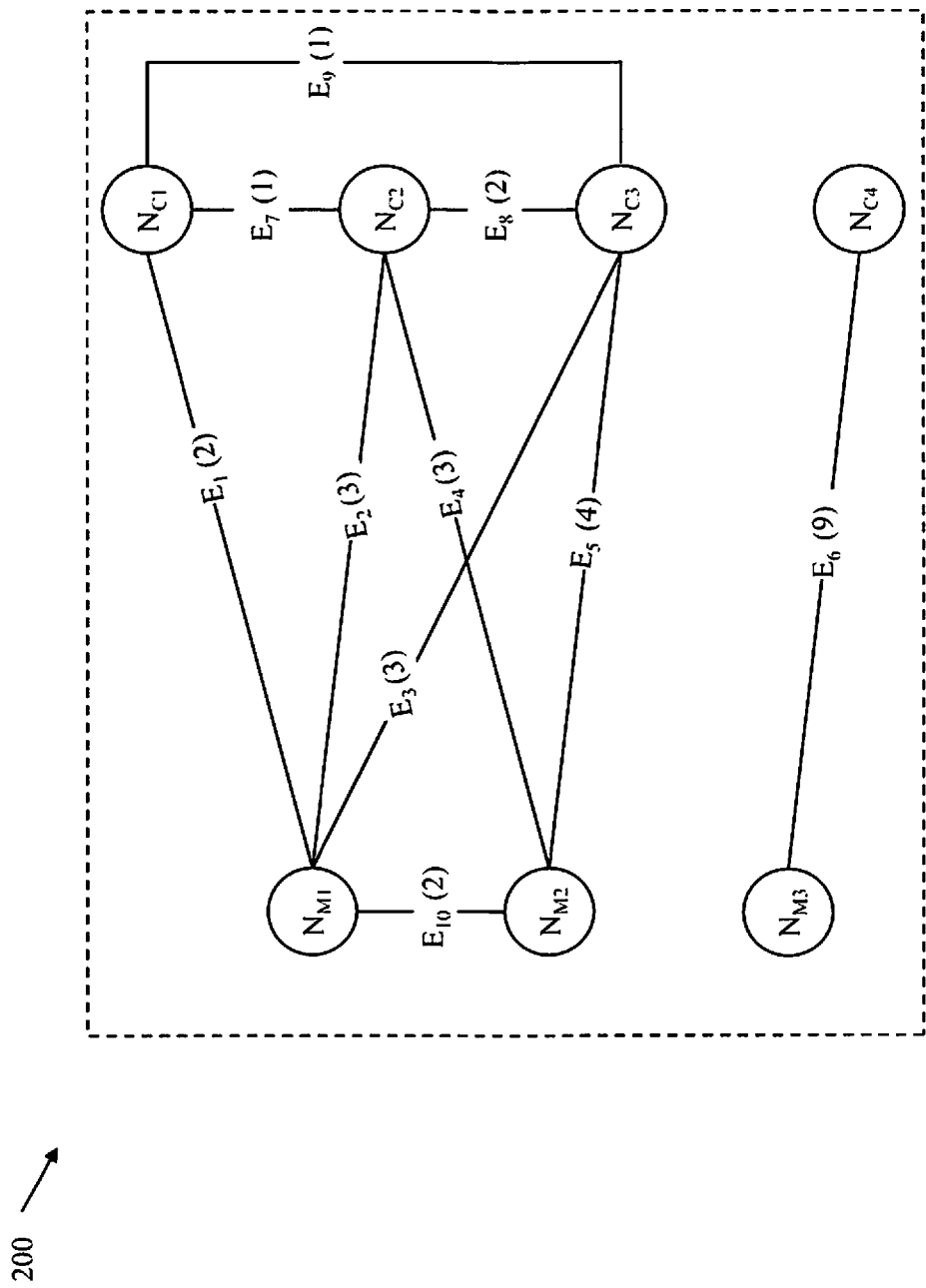
FIG. 2A is a schematic diagram that illustrates a first consumer-merchant graph generated by a fraud detection server of FIGS. 1A and 1B, in accordance with an embodiment of the present disclosure.
Figure 7A:
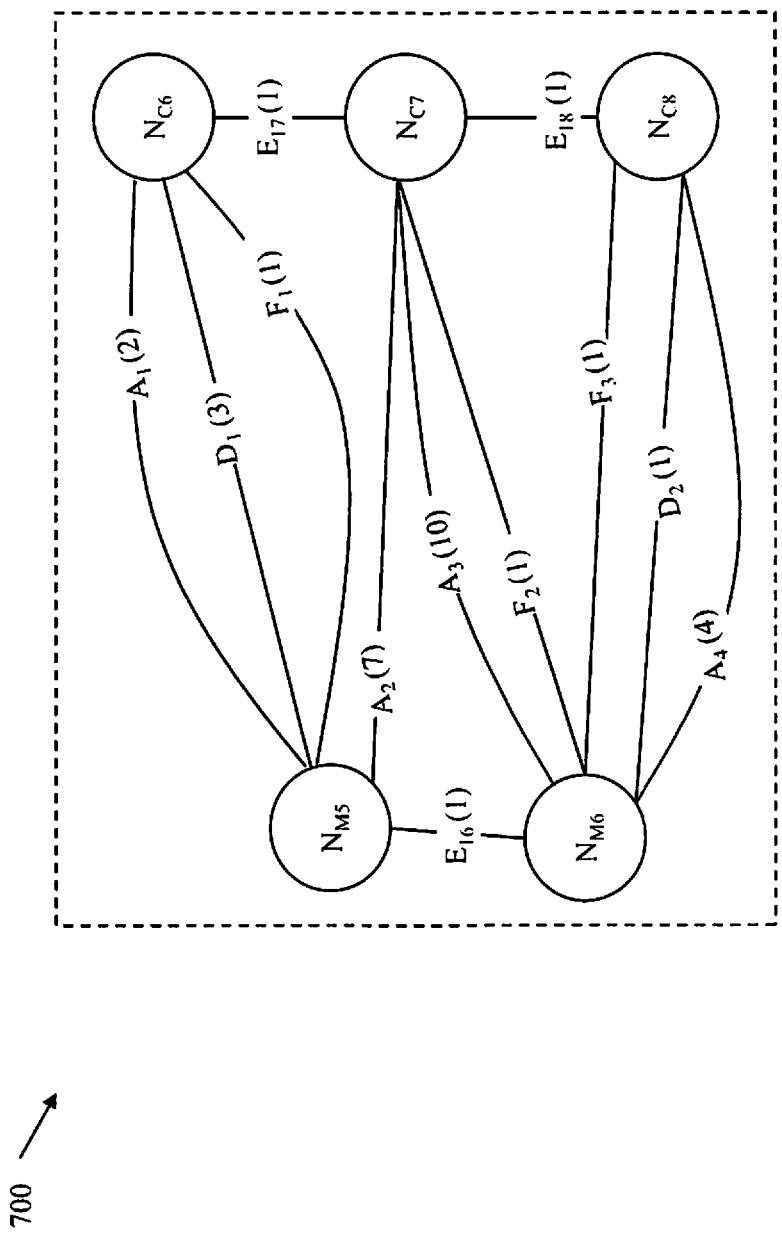
FIG. 7A is a schematic diagram that illustrates a second consumer-merchant graph generated by the fraud detection server, in accordance with another embodiment of the present disclosure.

The fraud detection server 110 is a server arrangement which includes suitable logic, circuitry, interface, and code, executable by the circuitry, for detecting fraudulent transactions in real-time or near real-time. The fraud detection server 110 is configured to generate a consumer-merchant graph (as shown in FIGS. 2A and 7A) based on the historical transaction data of various historical transactions executed between the merchants M1-Mn and the consumers C1-Cn. In the current embodiment, the fraud detection server 110 receives the historical transaction data from the payment network server 106. In other words, the fraud detection server 110 operates in conjunction with the payment network server 106. Upon generation of the consumer-merchant graph, the fraud detection server 110 is configured to segment the consumer-merchant graph into a plurality of clusters. The fraud detection server 110 is configured to determine a set of static features based on the historical transaction data. Examples of the static features may include a transaction amount, a transaction type, a merchant category code, an acquirer identifier, an MID, a transaction category code, a transaction currency code, or the like. The fraud detection server 110 is further configured to determine a plurality of dynamic features (e.g., a plurality of embeddings) based on the clustered consumer-merchant graph. Using the static and dynamic features, the fraud detection server 110 is configured to train a neural network for detecting fraudulent transactions in real-time or near real-time.

The fraud detection server 110 is further configured to utilize the trained neural network to detect whether a new transaction executed between a merchant and a consumer is fraudulent. The fraud detection server 110 communicates the output of the trained neural network (i.e., a detection result) to the payment network server 106. In one embodiment, when the new transaction is detected as fraudulent, the payment network server 106 declines the new transaction. In another embodiment, the payment network server 106 communicates the detection result to the issuer server 108. The fraud detection server 110 is further configured to update the consumer-merchant graph, the set of static features, and the plurality of dynamic features based on real-time or near real-time transactions. The updated static and dynamic features are utilized by the fraud detection server 110 to re-train the neural network. A time interval after which the fraud detection server 110 re-trains the neural network is defined by the fraud detection server 110 based on a requisite accuracy level, availability of computing resources or processing power to the fraud detection server 110, an average count of new transactions received by the payment network server 106 in a first time interval, or the like. Various operations performed by the fraud detection server 110 for detecting fraudulent transactions are explained in detail in conjunction with FIGS. 2A-2B, 3A-3B, 4, 5A-5D, 6, and 7A-7B. Various components of the fraud detection server 110 are explained in detail in conjunction with FIGS. 8A and 8B.

Examples of the acquirer server 104, the payment network server 106, the issuer server 108, and the fraud detection server 110 may include, but are not limited to, computers, laptops, mini-computers, mainframe computers, any non-transient and tangible machines that may execute a machine-readable code, cloud-based servers, distributed server networks, a network of computer systems, or a combination thereof.

The communication network 116 is a medium through which content and messages are transmitted between the merchant terminals 102a-102n, the acquirer server 104, the payment network server 106, the issuer server 108, the fraud detection server 110, and/or the consumer devices 114a-114n. Examples of the communication network 116 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100A may connect to the communication network 116 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 1B:
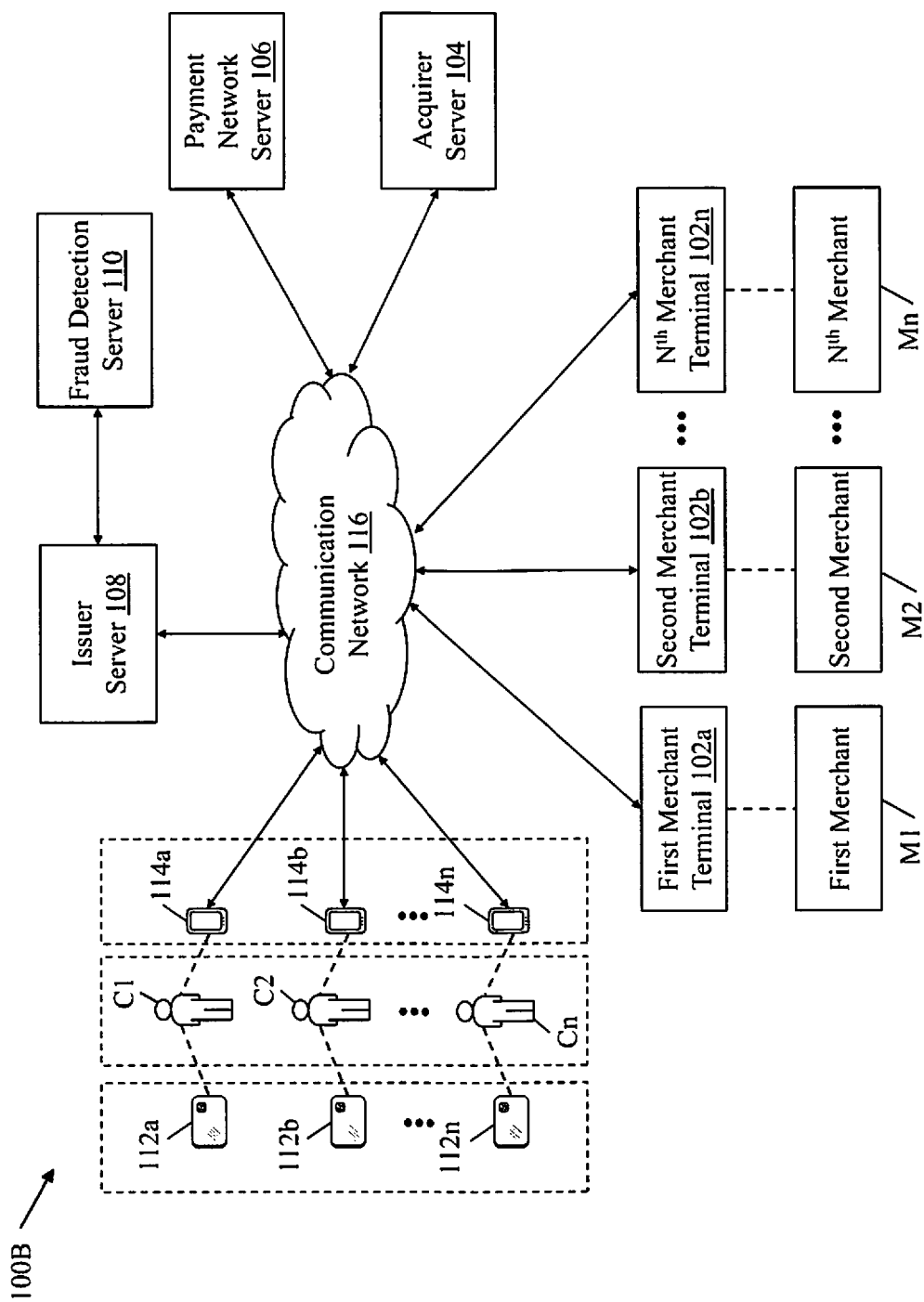
FIG. 1B is a block diagram that illustrates another environment for detecting fraudulent transactions, in accordance with another embodiment of the present disclosure.

FIG. 1B is a block diagram that illustrates another environment 100B for detecting fraudulent transactions, in accordance with another embodiment of the present disclosure. The environment 100B includes the merchant terminals 102a-102n of the respective merchants M1-Mn, the acquirer server 104, the payment network server 106, the issuer server 108, and the fraud detection server 110. The environment 100B further includes the consumers C1-Cn having their respective transaction cards 112a-112n and the respective consumer devices 114a-114n. The merchant terminals 102a-102n, the acquirer server 104, the payment network server 106, the issuer server 108, the fraud detection server 110, and the consumer devices 114a-114n may communicate with each other by way of the communication network 116.

In the present embodiment, the fraud detection server 110 is configured to operate in conjunction with the issuer server 108 instead of the payment network server 106 (as described in the foregoing description of FIG. 1A). Thus, the fraud detection server 110 receives the historical transaction data from the issuer server 108 and communicates the detection result of the trained neural network to the issuer server 108. In a scenario where the new transaction is detected as fraudulent, the issuer server 108 declines the new transaction.

FIG. 2A is a schematic diagram that illustrates a first consumer-merchant graph 200 generated by the fraud detection server 110, in accordance with an embodiment of the present disclosure.

The fraud detection server 110 receives the historical transaction data from one of the payment network server 106 and the issuer server 108. The historical transaction data includes information pertaining to the historical transactions executed between the merchants M1-Mn and the consumers C1-Cn. The fraud detection server 110 processes the historical transaction data by implementing one or more data processing operations, such as denoising, normalization, format conversion, or the like. The fraud detection server 110 processes the historical transaction data to obtain a data format that is suitable for data mining and generation of the first consumer-merchant graph 200.

The fraud detection server 110 then utilizes the processed historical transaction data to generate the first consumer-merchant graph 200. The fraud detection server 110 may utilize one or more graph databases known in the art (e.g., Neo4j, Janus Graph, or the like) to generate the first consumer-merchant graph 200 from the processed historical transaction data. The first consumer-merchant graph 200 includes a plurality of nodes $N_{M1}$-$N_{M3}$ and $N_{C1}$-$N_{C4}$ that are connected by way of a plurality of weighted edges $E_1$-$E_{10}$. Each merchant and consumer referenced in the historical transaction data is assigned a unique node in the first consumer-merchant graph 200. In one example, three merchants M1-M3 and four consumers C1-C4 are referenced in the historical transaction data. Thus, each merchant of the three merchants M1-M3 and each consumer of the four consumers C1-C4 is assigned a unique node in the first consumer-merchant graph 200. For example, the merchant M1 is assigned the node $N_{M1}$ and the consumer C1 is assigned the node $N_{C1}$.

In the first consumer-merchant graph 200, any node assigned to a merchant is referred to as a merchant node, while any node assigned to a consumer is referred to as a consumer node. Thus, the first consumer-merchant graph 200 includes a set of merchant nodes $N_{M1}$-$N_{M3}$ corresponding to the merchants M1-M3 and a set of consumer nodes $N_{C1}$-$N_{C4}$ corresponding to the consumers C1-C4. Each consumer node of the set of consumer nodes $N_{C1}$-$N_{C4}$ is indicative of various attributes of a corresponding consumer. For example, each consumer node may be indicative of a consumer identifier of a corresponding consumer, a country of residence of the corresponding consumer, or an issuer associated with the corresponding consumer. Similarly, each merchant node of the set of merchant nodes $N_{M1}$-$N_{M3}$ is indicative of various attributes of a corresponding merchant.

For example, each merchant node may be indicative of a merchant identifier of the corresponding merchant, a country of operation of the corresponding merchant, or an acquirer associated with the corresponding merchant.

Existence of a weighted edge between a merchant node and a consumer node implies that the historical transaction data is indicative of at least one transaction executed between a corresponding merchant and a corresponding consumer. For example, the edge $E_1$ between the consumer node $N_{C1}$ and the merchant node $N_{M1}$ indicates that the consumer C1 has transacted at least once with the merchant M1. Similarly, absence of an edge between the consumer node $N_{C1}$ and the merchant node $N_{M2}$ indicates that that the consumer C1 has not yet transacted with the merchant M2. A weight of an edge between a merchant node and a consumer node is indicative of a count of transactions that were executed between the corresponding merchant-consumer pair. For example, the edge $E_1$ between the merchant node $N_{M1}$ and the consumer node $N_{C1}$ has a weight '2', indicating that two transactions were executed between the consumer C1 and the merchant M1. Similarly, the edge $E_2$ between the merchant node $N_{M1}$ and the consumer node $N_{C2}$ has a weight '3', indicating that three transactions were executed between the consumer C2 and the merchant M1.

Existence of a weighted edge between two merchant nodes implies that the historical transaction data is indicative of at least one consumer common to merchants corresponding to the two merchant nodes. In other words, two merchant nodes are connected by an edge when the merchants corresponding to the two merchant nodes have transacted with the same consumer. Since both the merchants M1 and M2 have transacted with the consumers C2 and C3, the merchant nodes $N_{M1}$ and $N_{M2}$ are connected by way of the edge $E_{10}$. The consumer C4 has only transacted with the merchant M3, while the consumers C1-C3 have only transacted with the merchants M1 and M2. In other words, the merchant M1 has not transacted with the consumer C4, while the merchant M3 has not transacted with any of the consumers C1-C3. Therefore, there is no edge connecting the merchant nodes $N_{M1}$ and $N_{M3}$. A weight of an edge between two merchant nodes is indicative of a count of consumers common to the two corresponding merchants. For example, the edge $E_{10}$ between the merchant nodes $N_{M1}$ and $N_{M2}$ having a weight '2' indicates that two consumers (i.e., the consumers C2 and C3) are common to the merchants M1 and M2.

Existence of a weighted edge between two consumer nodes implies that the historical data is indicative of at least one merchant common to consumers corresponding to the two consumer nodes. In other words, two consumer nodes are connected by an edge when the consumers corresponding to the two consumer nodes have transacted with the same merchant. Since both the consumers C1 and C2 have transacted with the merchant M1, the consumer nodes $N_{C1}$ and $N_{C2}$ are connected by way of the edge $E_7$. The consumer C1 has only transacted with the merchant M1, while the consumer C4 has only transacted with the merchant M3. In other words, the consumer C1 has not transacted with the merchant M3, while the consumer C4 has not transacted with the merchant M1. Therefore, no edge exists between the consumer nodes $N_{C1}$ and $N_{C4}$. A weight of an edge between two consumer nodes is indicative of a count of merchants common to the two corresponding consumers. For example, the edge $E_7$ having a weight '1' indicates that one merchant (i.e., the merchant M1) is common to the consumers C1 and C2.

It will be apparent to a person of ordinary skill in the art that the first consumer-merchant graph 200 is highly simplified for the sake of brevity and should not be construed as a limitation to the scope of the disclosure. In actual implementation, the historical transaction data may be significantly more comprehensive and a corresponding consumer-merchant graph generated by the fraud detection server 110 may be more expansive and complex in terms of number of nodes and edges included in the consumer-merchant graph. In another embodiment, edges between merchant and consumer nodes may be multi-variate edges. Another consumer-merchant graph having multi-variate edges is described in conjunction with FIG. 7A.

Figure 2B:
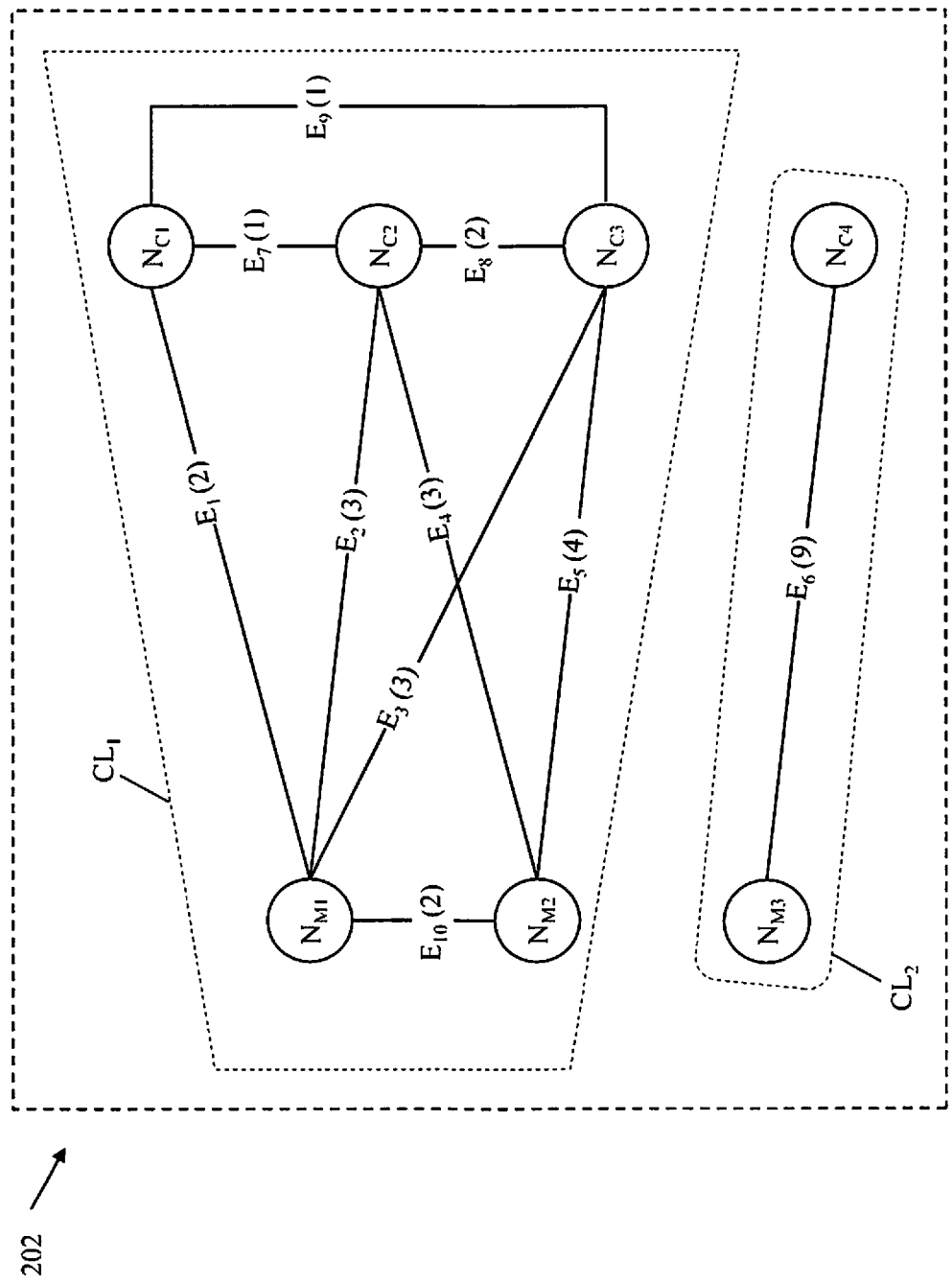
FIG. 2B is a schematic diagram that illustrates a clustered graph, in accordance with an embodiment of the present disclosure.

FIG. 2B is a schematic diagram that illustrates a clustered graph 202, in accordance with an embodiment of the present disclosure. FIG. 2B is described in conjunction with FIG. 2A. The fraud detection server 110 obtains the clustered graph 202 based on the first consumer-merchant graph 200.

The fraud detection server 110 classifies the nodes $N_{M1}$-$N_{M3}$ and $N_{C1}$-$N_{C4}$ in the first consumer-merchant graph 200 into a set of clusters $CL_1$ and $CL_2$, based on a degree of similarity among the nodes $N_{M1}$-$N_{M3}$ and $N_{C1}$-$N_{C4}$. In other words, nodes that are similar to each other are classified into the same cluster. For example, the fraud detection server 110 classifies the nodes $N_{M1}$-$N_{M2}$ and $N_{C1}$-$N_{C3}$ into one cluster $CL_1$ based on the degree of similarity among the nodes $N_{M1}$-$N_{M2}$ and $N_{C1}$-$N_{C3}$. Similarly, the fraud detection server 110 classifies the nodes $N_{M3}$ and $N_{C4}$ into another cluster $CL_2$ based on the degree of similarity between the nodes $N_{M3}$ and $N_{C4}$. In other words, dissimilar nodes are classified into different clusters. For classifying the nodes $N_{M1}$-$N_{M3}$ and $N_{C1}$-$N_{C4}$ into the set of clusters $CL_1$ and $CL_2$, the fraud detection server 110 may utilize one or more graph clustering techniques that are known in the art. Examples of such graph clustering techniques may include, but are not limited to, Markov clustering technique, Spectral clustering technique, Affinity propagation technique, or Hierarchical clustering technique. For the sake of ongoing description, it is assumed that the fraud detection server 110 utilizes Markov clustering technique for obtaining the clustered graph 202 from the first consumer-merchant graph 200.

For implementing Markov clustering technique, the fraud detection server 110 initially samples the first consumer-merchant graph 200 by way of multiple random walks. For obtaining a random walk, the first consumer-merchant graph 200 is traversed for a limited number of steps based on the weighted edges between the nodes $N_{M1}$-$N_{M3}$ and $N_{C1}$-$N_{C4}$, and the nodes visited are recorded as the random walk. Based on these random walks, the fraud detection server 110 generates a transition probability matrix (i.e., interchangeably referred to as "the matrix") that indicates a transition probability of traveling from one node to another node in the first consumer-merchant graph 200. For example, as the merchant node $N_{M1}$ is connected to four nodes $N_{M2}$ and $N_{C1}$-$N_{C3}$, the matrix indicates that the transition probability of traveling from the merchant node $N_{M1}$ to any of the four nodes $N_{M2}$ and $N_{C1}$-$N_{C3}$ is '0.25'. In other words, from the merchant node $N_{M1}$, traveling to any of the four nodes $N_{M2}$ and $N_{C1}$-$N_{C3}$ is equiprobable. Since the merchant node $N_{M1}$ is not connected to the nodes $N_{M3}$ and $N_{C4}$, the matrix indicates that the transition probability for traveling from the merchant node $N_{M1}$ node to the nodes $N_{M3}$ and $N_{C4}$ is '0'. The fraud detection server 110 then normalizes the matrix.

The fraud detection server 110 further expands the matrix by taking the $e^{th}$ power of the matrix. For example, when e=4, the fraud detection server 110 further expands the matrix by taking the $4^{th}$ power of the matrix. The fraud detection server 110 then inflates the expanded matrix according to a configurable parameter 'r'. For example, when r=2, the fraud detection server 110 takes $2^{nd}$ power of each element of the expanded matrix and normalizes the values. The fraud detection server 110 repeats the expansion and inflation steps until the resultant matrix converges (i.e., no significant value changes occur in the resultant matrix during subsequent iterations) to reveal the set of clusters $CL_1$ and $CL_2$. It will be apparent to a person of ordinary skill in the art that the clustered graph 202 is shown for purposes and should not be construed as a limitation to the scope of the disclosure. Further, in FIG. 2B, the clusters $CL_1$ and $CL_2$ are shown to be disjoint. However, in other embodiments, the clusters $CL_1$ and $CL_2$ may not be disjoint.

Figure 3A:
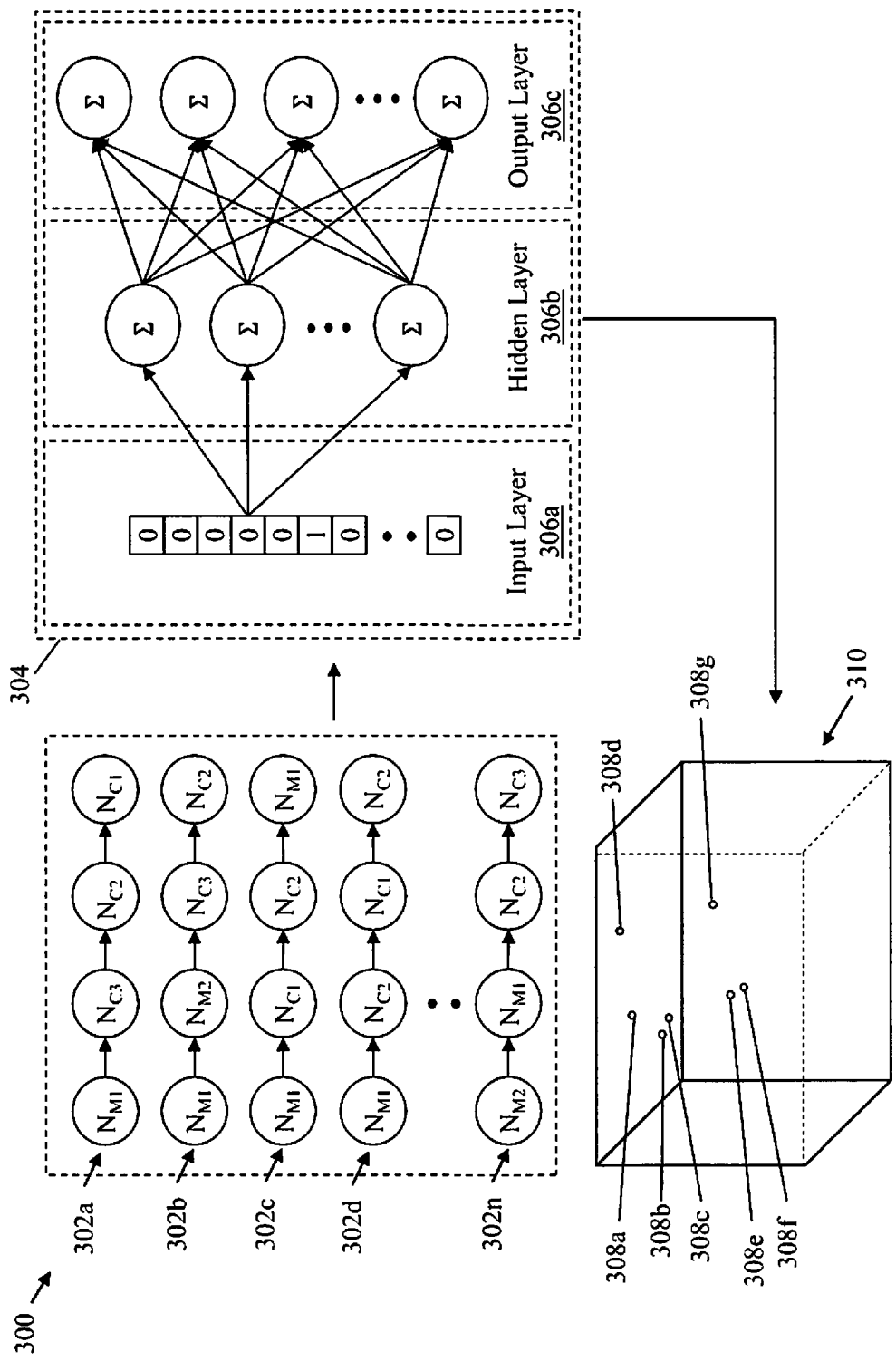

FIGS. 3A and 3B are schematic diagrams that collectively illustrate an scenario 300 for determination of a plurality of dynamic features by the fraud detection server 110, in accordance with an embodiment of the present disclosure.

With reference to FIG. 3A, the fraud detection server 110 determines the plurality of dynamic features from the clustered graph 202. The plurality of dynamic features include a plurality of embeddings determined by the fraud detection server 110 for the nodes $N_{M1}$-$N_{M3}$ and $N_{C1}$-$N_{C4}$ and the set of clusters $CL_1$ and $CL_2$ in the clustered graph 202. The fraud detection server 110 may utilize graph embedding approach for determining the plurality of dynamic features. Hereinafter, the plurality of dynamic features are interchangeably referred to as "the plurality of embeddings" or "the embeddings".

Graph embedding is an approach that is used to transform nodes and clusters of a graph into a vector space (a lower dimension) whilst maximally preserving their properties, such as node and cluster information. The graph embedding may be performed at a node level and a cluster level. Examples of various techniques used to implement graph embedding may include DeepWalk, Node2vec, Sub2vec, Graph2vec, Structural Deep Network embedding, or the like. The fraud detection server 110 may use one or more of these techniques to implement graph embedding, without deviating from the scope of the disclosure. For the sake of ongoing description, it is assumed that the fraud detection server 110 utilizes Node2vec and Sub2vec techniques to implement graph embedding for the clustered graph 202. Using Node2vec technique, a node's information is encoded into an embedding (i.e., a vector) by obtaining a set of random walks originating from that node. Similarly, using Sub2vec technique, a cluster's information is encoded into an embedding (i.e., a vector) by obtaining a set of random walks originating from that cluster.

A random walk originates from a selected node or cluster and advances to a random neighbor from a current node or cluster for a defined number of steps.

As a first step in executing the Node2vec technique, the fraud detection server 110 samples the clustered graph 202 to obtain a set of random walks 302a-302n. Each random walk 302a-302n is shown to originate from the nodes $N_{M1}$-$N_{M3}$ and $N_{C1}$-$N_{C4}$ of the clustered graph 202 and has, for example, four steps. It will be apparent to a person of ordinary skill in the art that the fraud detection server 110 may obtain as many random walks as required for its operation.

As a second step in executing the Node2vec technique, the fraud detection server 110 trains a skip-gram neural network 304 to determine an embedding for each of the nodes $N_{M1}$-$N_{M3}$ and $N_{C1}$-$N_{C4}$. The skip-gram neural network 304 includes an input layer 306a, a hidden layer 306b, and an output layer 306c. For determining the embeddings for the nodes $N_{M1}$-$N_{M3}$ and $N_{C1}$-$N_{C4}$, the skip-gram neural network 304 accepts, at the input layer 306a, latent representations of a node from corresponding random walks (e.g., the set of random walks 302a-302n) as a one-hot encoding vector and maximizes the probability for predicting neighbor nodes for the input. For example, the one-hot encoding may be a binary vector (e.g., a column matrix or a row matrix) with length same as that of a number of nodes (i.e., "7") in the clustered graph 202. Typically, in a one-hot encoding vector, all elements barring a single element are equal to zero. The single element may be "1" corresponding to a position of an encoded node in a graph dictionary (i.e., a list of nodes) of the clustered graph 202. For example, if the node $N_{C1}$ is at a third position in the graph dictionary that lists 7 nodes, the one-hot encoding vector for the node $N_{C1}$ is a row matrix with 7 columns having all zeroes except at third element, which includes "1".

The hidden layer 306b outputs an embedding of the node for which the one-hot encoding vector is provided to the input layer 306a. The output layer 306c includes a SoftMax regression classifier that predicts neighboring nodes of the node for which the one-hot encoding vector is provided to the input layer 306a. The output of the output layer 306c is also a one-hot encoding vector representation of the predicted neighboring nodes. The training of the skip-gram neural network 304 is a well-known method in the art, and so its detailed description is omitted for sake of brevity. Primarily, the skip-gram neural network 304 is trained to learn weights of the hidden layer 306b.

As a third step in executing the Node2vec technique, the fraud detection server 110 determines embeddings 308a-308g for the nodes $N_{M1}$-$N_{M3}$ and $N_{C1}$-$N_{C4}$ in the clustered graph 202 using the trained skip-gram neural network 304. Embedding for each node $N_{M1}$-$N_{M3}$ and $N_{C1}$-$N_{C4}$ is generated based on the output of hidden layer 306b of the trained skip-gram neural network 304, as shown by equation (1) below:

$$[0\ 0\ 1\ 0\ 0\ 0\ 0] \times \begin{bmatrix} 0.1 & 0.8 & 0.7 \\ 0.3 & 0.5 & 0.7 \\ 0.5 & 0.6 & 0.1 \\ 0.1 & 0.4 & 0.2 \\ 0.8 & 0.4 & 0.2 \\ 0.2 & 0.4 & 0.8 \\ 0.1 & 0.8 & 0.5 \end{bmatrix} = [0.5\ 0.6\ 0.1] \quad (1)$$

where, $[0\ 0\ 1\ 0\ 0\ 0\ 0]$ is one-hot encoding vector for the node $N_{C1}$ provided as input to the input layer 306a of the trained skip-gram neural network 304, $$\begin{bmatrix} 0.1 & 0.8 & 0.7 \\ 0.3 & 0.5 & 0.7 \\ 0.5 & 0.6 & 0.1 \\ 0.1 & 0.4 & 0.2 \\ 0.8 & 0.4 & 0.2 \\ 0.2 & 0.4 & 0.8 \\ 0.1 & 0.8 & 0.5 \end{bmatrix}$$

is a weight matrix of the hidden layer 306b with rows (one for each node in the clustered graph 202) and columns (one for each neuron in the hidden layer 306b) obtained from the trained skip-gram neural network 304, and $[0.5\ 0.6\ 0.1]$ is an embedding determined for the node $N_{C1}$.

The embeddings 308a-308g generated by the fraud detection server 110 for the nodes $N_{M1}$-$N_{M3}$ and $N_{C1}$-$N_{C4}$ represent the nodes $N_{M1}$-$N_{M3}$ and $N_{C1}$-$N_{C4}$ as points in a d-dimensional embedding space 310, where "d" denotes any suitable number of dimensions. For illustrative purpose, the embeddings 308a-308g determined by the fraud detection server 110 are represented as various points plotted in the d-dimensional embedding space 310, e.g., a three-dimensional embedding space 310. Each column in the weight matrix of the hidden layer 306b corresponds to a dimension of the d-dimensional embedding space 310. Each embedding 308a-308g includes coordinates for a corresponding point in the embedding space 310.

The fraud detection server 110 further implements Sub2vec technique for determining embeddings for the clusters $CL_1$ and $CL_2$. As a first step to execute Sub2vec technique, the fraud detection server 110 samples the clustered graph 202 with random walks. Each random walk originates from the clusters $CL_1$ and $CL_2$. As a second step to execute Sub2vec technique, the fraud detection server 110 trains another skip-gram neural network to determine the embeddings for each cluster $CL_1$ and $CL_2$. It will be apparent to a person of ordinary skill in the art that the skip-gram neural network in Sub2vec technique is trained in a similar manner as the skip-gram neural network 304 is trained in Node2vec technique. As a third step to execute Sub2vec technique, the fraud detection server 110 determines the embeddings for the clusters $CL_1$ and $CL_2$ using the trained skip-gram neural network. The embeddings determined by the fraud detection server 110 for the clusters $CL_1$ and $CL_2$ represent the clusters $CL_1$ and $CL_2$ as points in the d-dimensional embedding space 310, where "d" denotes any suitable number of dimensions. The embeddings generated by the fraud detection server 110 for the clusters $CL_1$ and $CL_2$ are shown in FIG. 3B.

With reference to FIG. 3B, various embeddings 308a-308i determined by the fraud detection server 110 for the nodes $N_{M1}$-$N_{M3}$ and $N_{C1}$-$N_{C4}$ and the clusters $CL_1$ and $CL_2$, respectively, are shown. The embeddings 308a-308i collectively correspond to the plurality of dynamic features. In FIG. 3B, the embeddings 308a-308i of the respective nodes $N_{M1}$-$N_{M3}$ and $N_{C1}$-$N_{C4}$ and the respective clusters $CL_1$ and $CL_2$ are illustrated as tables, each having one row with 8 columns. It will be apparent to a person of ordinary skill in the art that the embeddings 308a-308i are shown for purposes and should not be construed as limitations to the scope of the disclosure.

After determining the embeddings 308h and 308i for the respective clusters $CL_1$ and $CL_2$, the fraud detection server 110 is configured to identify one or more dominant nodes in each cluster $CL_1$ and $CL_2$. For identifying the dominant nodes in the cluster $CL_1$, the fraud detection server 110 observes a change (or variation) caused to the embedding 308h of the cluster $CL_1$ by temporary addition or removal of each node $N_{M1}$-$N_{M2}$ and $N_{C1}$-$N_{C3}$ in the cluster $CL_1$. For example, the fraud detection server 110 temporarily removes the merchant node $N_{M1}$ from the cluster $CL_1$ and determines a new embedding for the resultant cluster $CL_1$. The fraud detection server 110 then compares the previous embedding 308h with the new embedding of the cluster $CL_1$ to observe a difference in the previous embedding 308h and the new embedding of the cluster $CL_1$. In a scenario where the difference in the previous embedding 308h and the new embedding of the cluster $CL_1$ exceeds a first threshold value, the fraud detection server 110 identifies the merchant node $N_{M1}$ as one of the dominant nodes of the cluster $CL_1$. However, if the difference in the previous embedding 308h and the new embedding of the cluster $CL_1$ is less than or equal to first threshold value, the fraud detection server 110 identifies the node $N_{M1}$ as a non-dominant node of the cluster $CL_1$. Similarly, the fraud detection server 110 observes the changes caused to the embedding 308h of the cluster $CL_1$ by the temporary addition and/or removal of other nodes $N_{M2}$ and $N_{C1}$-$N_{C3}$ and identifies the one or more dominant nodes of the cluster $CL_1$. In a similar manner, the fraud detection server 110 identifies the one or more dominant nodes of the cluster $CL_2$. In a non-limiting example, it is assumed that the consumer node $N_{C1}$ is the only dominant node of the cluster $CL_1$ and the merchant node $N_{M3}$ the only dominant node of the cluster $CL_2$.

The fraud detection server 110 may set the first threshold value based on the requisite accuracy level and the availability of computing resources or processing power to the fraud detection server 110. For example, in a scenario where the fraud detection server 110 requires a high accuracy level and has enough computing resources available, the fraud detection server 110 sets the first threshold value to a relatively high value. However, in a scenario where the fraud detection server 110 does not require a high level of accuracy or does not have sufficient computing resources available, the fraud detection server 110 sets the first threshold value to a relatively low value. In other words, the first threshold value is a function of the requisite accuracy level and the availability of computing resources.

Figure 4:
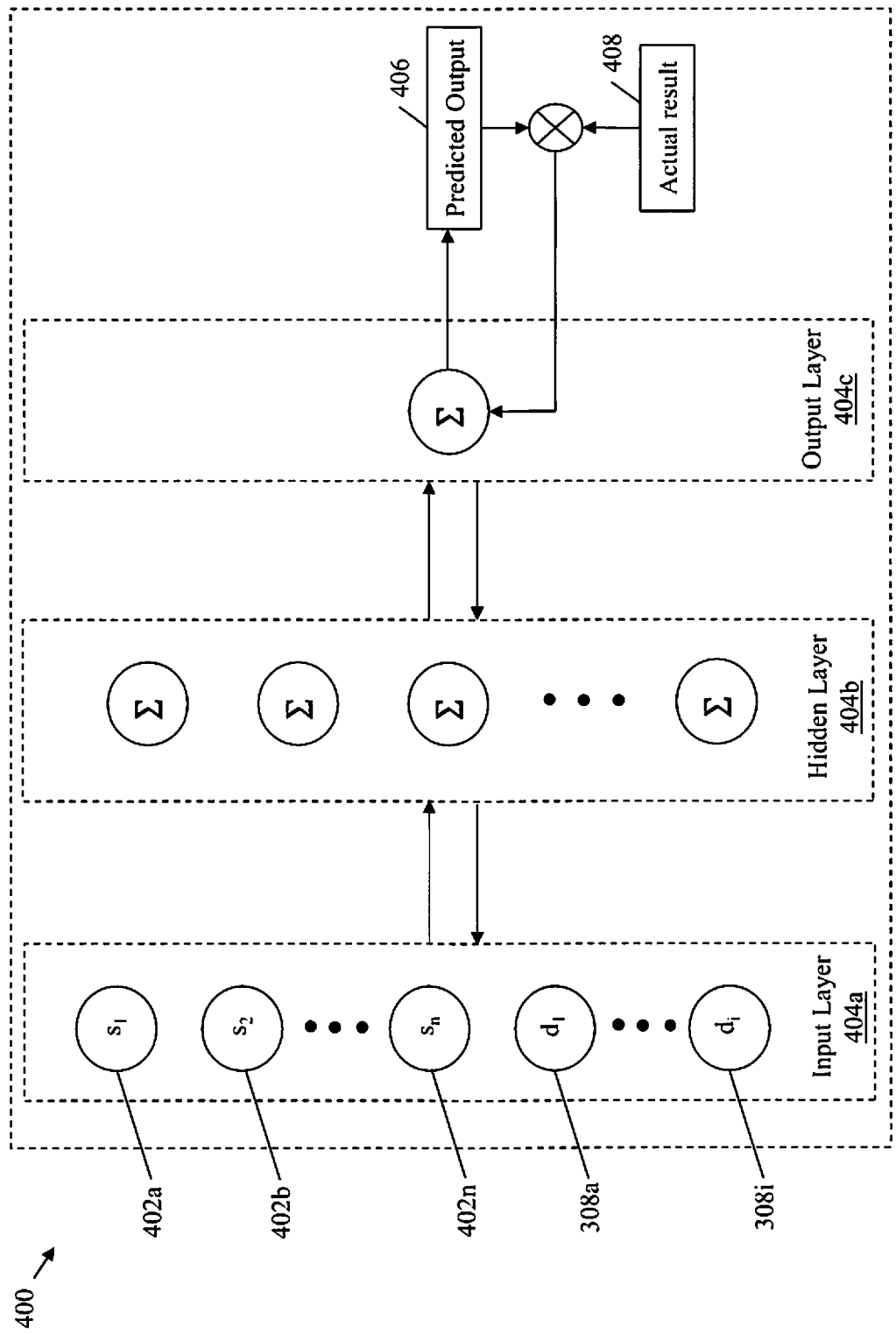
FIG. 4 is a schematic diagram that illustrates a neural network trained by the fraud detection server for detecting fraudulent transactions, in accordance with an embodiment of the present disclosure.

FIG. 4 is a schematic diagram that illustrates a neural network 400 trained by the fraud detection server 110 for detecting fraudulent transactions, in accordance with an embodiment of the present disclosure. Examples of the neural network 400 may include a convolution neural network (CNN), a deep neural network (DNN), a recurrent neural network (RNN) such as Long Short Term Memory networks (LSTM) networks, or an artificial neural network that may be a combination of the RNN and CNN networks.

Prior to training the neural network 400, the fraud detection server 110 is further configured to determine the set of static features (hereinafter, designated and referred to as "the static features 402a-402n") that are associated with determination of fraudulent transactions, based on the historical transaction data. For example, if two simultaneous transactions performed by using the transaction card 112b correspond to two different geo-locations (e.g., India and Singapore), either one or both the transactions may be fraudulent. Thus, geo-location of a transaction is a static feature that may be used as an indicator of transaction fraud. In other words, the static features 402a-402n are those features of the historical transaction data that serve as indicators for transaction fraud. In one example, the static features 402a-402n may be determined from transaction messages included in the historical transaction data. In one embodiment, the static features 402a-402n correspond to various data elements included in the transaction messages. For example, the static features 402a-402n may include a transaction amount feature, a transaction type feature, a merchant category code feature, an acquirer identifier feature, an MID feature, a transaction category code feature, a transaction currency code feature, a geo-location feature, or the like.

The fraud detection server 110 then trains the neural network 400 using the static features 402a-402n and the embeddings 308a-308i (i.e., the plurality of dynamic features) as training data. The fraud detection server 110 may employ machine learning algorithms, such as supervised, unsupervised, semi-supervised, or reinforcement machine learning algorithms for training the neural network 400. Typically, the machine learning algorithms refer to a category of algorithms employed by a system that allows the system to become more accurate in predicting outcomes and/or performing tasks, without being explicitly programmed.

The neural network 400 includes an input layer 404a, a hidden layer 404b, and an output layer 404c. In a non-limiting example, it is assumed that the neural network 400 is trained using back-propagation technique. For implementing the back-propagation technique, weights of hidden neurons in the hidden layer 404b are set to random initial values. The static features 402a-402n and the embeddings 308a-308i (i.e., the plurality of dynamic features) are used to build the input layer 404a. Historical transaction data of a batch of historical transactions is then provided as input to the input layer 404a and using the initialized weights of the hidden layer 404b, the output layer 404c generates a predicted output 406. In one embodiment, the predicted output 406 is a probability score that indicates a likelihood of each of the historical transactions being fraudulent. The predicted output 406 is then compared with a known true result (i.e., an actual result 408) for the historical transactions to compute an error value. The error value indicates a difference between the predicted output 406 and the actual result 408. The error value is then fed back to the neural network 400 for determining the effect of the weight of each hidden neuron on the predicted output 406. The weights of the hidden neurons of the hidden layer 404b are then updated so as to reduce the error value. The weights of the hidden neurons of the hidden layer 404b are iteratively updated using different batches of historical transactions to minimize the error value. The training of the neural network 400 ends when the error value is minimum, i.e., when the error value does not change in subsequent iterations.

For the sake of brevity, the neural network 400 is shown to include a single hidden layer 404b. However, it will be apparent to those of ordinary skill in the art that the neural network 400 may include any number of hidden layers without deviating from the scope of the disclosure.

When the training of the neural network 400 is complete, the fraud detection server 110 utilizes the trained neural network 400 to detect fraudulent transactions in real-time or near real-time. For example, at a time-instance T=t+1, the fraud detection server 110 receives first transaction data of a first transaction from one of the payment network server 106 or the issuer server 108. The first transaction data is indicative of a consumer-merchant pair associated with the first transaction. The first transaction data is further indicative of a transaction amount, a timestamp, a geo-location, a transaction type, a merchant category code, an MID, a transaction category code, a transaction currency code, or the like, of the first transaction. The fraud detection server 110 provides the first transaction data of the first transaction as input to the trained neural network 400. Based on the first transaction data, the trained neural network 400 generates the predicted output 406. In one embodiment, the predicted output 406 is a probability score that indicates a likelihood that the first transaction is a fraudulent transaction.

In such a scenario, when the value indicated by the predicted output 406 is greater than a second threshold value, the fraud detection server 110 detects that the first transaction is a fraudulent transaction. However, when the value indicated by the predicted output 406 is less than or equal to the second threshold value, the fraud detection server 110 detects that the first transaction is a legitimate transaction. In another embodiment, the predicted output 406 may be a probability score that indicates a likelihood that the first transaction is legitimate. In such a scenario, when the value indicated by the predicted output 406 is greater than the second threshold value, the fraud detection server 110 detects that the first transaction is a legitimate transaction. However, when the value indicated by the predicted output 406 is less than or equal to the second threshold value, the fraud detection server 110 detects that the first transaction is a fraudulent transaction.

The fraud detection server 110 communicates the result of the detection for the first transaction to one of the payment network server 106 or the issuer server 108. The first transaction is processed by the payment network server 106 or the issuer server 108 based on the result of the detection. For example, when the result of the detection indicates that the first transaction is fraudulent, the payment network server 106 or the issuer server 108 declines the first transaction. In another example, when the result of the detection indicates that the first transaction is legitimate, the issuer server 108 processes the first transaction for authorization.

In another embodiment, the neural network 400 may be further trained to indicate a fraud category associated with the first transaction. For example, the transaction fraud may be segregated into first and second fraud categories, e.g., consumer fraud and merchant fraud. In such a scenario, based on the first transaction data of the first transaction, the neural network 400 generates an output for each of the first and second fraud categories. From the first and second fraud categories that has the highest value of the output is identified as the fraud category for the first transaction.

The fraud detection server 110 updates the clustered graph 202 based on the first transaction data of the first transaction. Due to an update in the clustered graph 202, the fraud detection server 110 further updates the embeddings 308a-308i. Various operations performed by the fraud detection server 110 to update the clustered graph 202 and the embeddings 308a-308i are described in conjunction with FIGS. 5A-5D.

FIGS. 5A-5D are schematic diagrams that illustrate scenarios 500A-500D for updating the clustered graph 202, in accordance with an embodiment of the present disclosure.

Figure 5A:
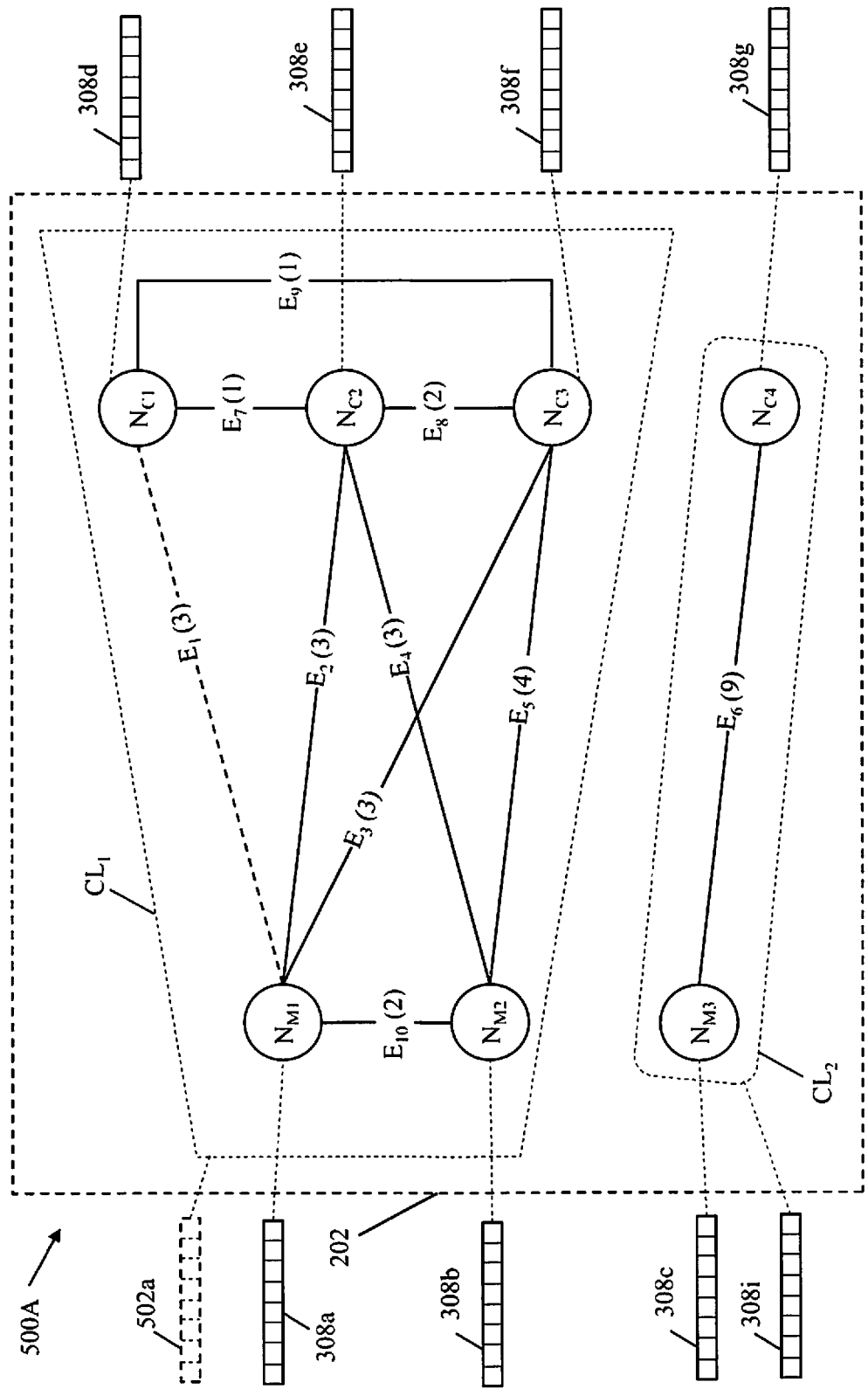
FIGS. 5A-5D are schematic diagrams that illustrate scenarios for updating the clustered graph of FIG. 2B, in accordance with an embodiment of the present disclosure.

With reference to FIG. 5A, the scenario 500A illustrates an example where the fraud detection server 110 modifies the weight of an existing edge in the clustered graph 202. Before the reception of the first transaction, the plurality of dynamic features include the embeddings 308-308i corresponding to the nodes $N_{M1}$-$N_{M3}$ and $N_{C1}$-$N_{C4}$ and the clusters $CL_1$ and $CL_2$, respectively (as shown in FIGS. 3A and 3B). At the time-instance T=t+1, the fraud detection server 110 receives the first transaction data of the first transaction. In one example, the first transaction data indicates that the first transaction is executed between the merchant M1 and the consumer C1. Based on the reception of the first transaction data, the fraud detection server 110 identifies a cluster in the clustered graph 202 that corresponds to the first transaction. In the present scenario, the fraud detection server 110 identifies that the first transaction is associated with the cluster $CL_1$ as the merchant M1 and the consumer C1 involved in the first transaction are associated with the cluster $CL_1$ by way of the merchant node $N_{M1}$ and the consumer node $N_{C1}$. The fraud detection server 110 then identifies that the edge $E_1$ having the weight '2' already exists between the merchant node $N_{M1}$ and the consumer node $N_{C1}$. In such a scenario, the fraud detection server 110 modifies the weight of the edge $E_1$ from '2' to '3' to indicate that a new transaction has been executed between the merchant M1 and the consumer C1. The modified edge $E_1$ is shown by a dashed line in FIG. 5A. The fraud detection server 110 retains the weights of those edges $E_2$-$E_{10}$ that are not affected by the first transaction or the modification in the weight of the edge $E_1$.

In one embodiment, upon modifying the weight of the edge $E_1$, the fraud detection server 110 updates the embedding 308h of the cluster $CL_1$ to obtain an updated embedding 502a. The modification in the weight of the edge $E_1$ may further cause the fraud detection server 110 to update the embeddings 308a and 308d of the nodes $N_{M1}$ and $N_{C1}$ that are associated with the edge $E_1$ for which the weight is modified. Prior to updating the embeddings 308a and 308d of the nodes $N_{M1}$ and $N_{C1}$, the fraud detection server 110 compares the previous embedding 308h and the updated embedding 502a of the cluster $CL_1$ to observe the difference therebetween. In one scenario, when the difference between the updated embedding 502a and the previous embedding 308h is less than the first threshold value, the fraud detection server 110 may not update the embeddings 308a and 308d of the respective nodes $N_{M1}$ and $N_{C1}$. In another scenario, when the difference between the updated embedding 502a and the previous embedding 308h is greater than or equal to the first threshold value, the fraud detection server 110 may update the embeddings 308a and 308d of the respective nodes $N_{M1}$ and $N_{C1}$.

In a non-limiting example, it is assumed that the fraud detection server 110 only obtains the updated embedding 502a for the cluster $CL_1$ and retains the embeddings 308a and 308d of the respective nodes $N_{M1}$ and $N_{C1}$ that are associated with the edge $E_1$. Similarly, the fraud detection server 110 retains the embeddings 308b-308c, and 308e-308g of the remaining nodes $N_{M2}$-$N_{M3}$ and $N_{C2}$-$N_{C4}$, respectively, and the embedding 308i of the cluster $CL_2$. In other words, the fraud detection server 110 updates the embeddings 308a-308i (i.e., the plurality of dynamic features) based on the modification in the weight of the edge $E_1$ to obtain the updated embeddings 308a-308g, 502a, and 308i. Thus, at the time-instance T=t+1, the updated embeddings 308a-308g, 502a, and 308i constitute the updated plurality of dynamic features. New and updated embeddings are shown as dashed boxes in FIG. 5A.

Figure 5B:
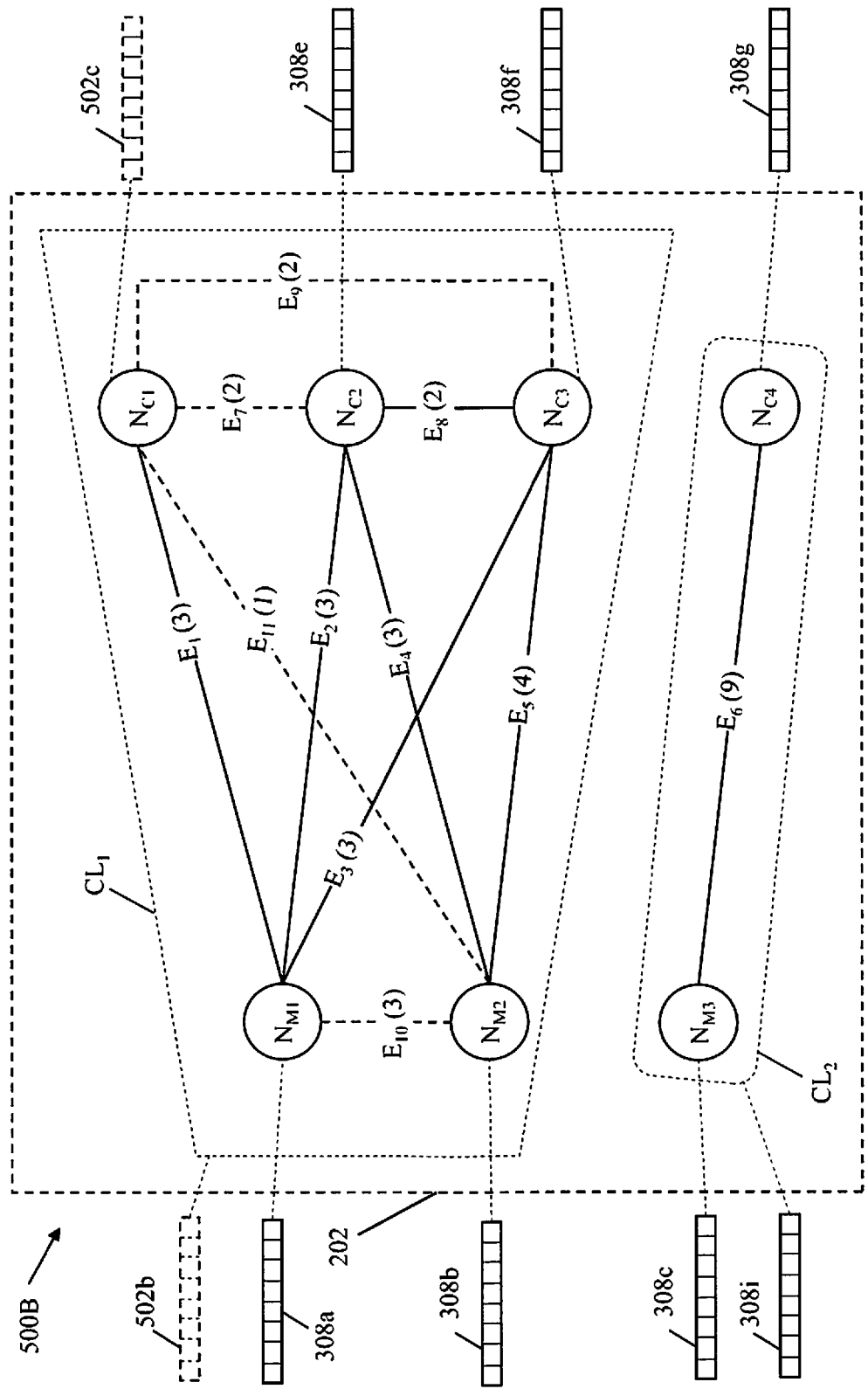

With reference to FIG. 5B, the scenario 500B illustrates an example where the fraud detection server 110 forms a new edge in the clustered graph 202. At a time-instance T=t+2, the fraud detection server 110 receives second transaction data of a second transaction. Before the time-instance T=t+2, the plurality of dynamic features include the embeddings 308a-308g, 502a, and 308i corresponding to the nodes $N_{M1}$-$N_{M3}$ and $N_{C1}$-$N_{C4}$ and the clusters $CL_1$ and $CL_2$, respectively (as shown in FIG. 5A).

In one example, the second transaction data indicates that the second transaction is executed between the merchant M2 and the consumer C1. Based on the reception of the second transaction data, the fraud detection server 110 identifies that the second transaction is associated with the cluster $CL_1$ as the merchant M2 and the consumer C1 involved in the second transaction are associated with the cluster $CL_1$ by way of the merchant node $N_{M2}$ and the consumer node $N_{C1}$. The fraud detection server 110 then identifies that no edge is present between the merchant node $N_{M2}$ and the consumer node $N_{C1}$. In such a scenario, the fraud detection server 110 forms a new edge $E_{11}$ in the cluster $CL_1$ to connect the merchant node $N_{M2}$ and the consumer node $N_{C1}$. Since the merchant M2 and the consumer C1 have transacted for the first time by way of the second transaction, the fraud detection server 110 assigns a weight '1' to the edge $E_{11}$.

The formation of the new edge $E_{11}$ causes the fraud detection server 110 to modify the weights of one or more existing edges in the cluster $CL_1$ that are affected by the formation of the new edge $E_{11}$. As shown in FIG. 5B, the fraud detection server 110 modifies the weights of the edges $E_7$, $E_9$, and $E_{10}$. The weight of the edge $E_7$ is modified from '1' to '2' to indicate that the count of merchants common to the consumers C1 and C2 has increased from one to two. The weight of the edge $E_9$ is modified from '1' to '2' to indicate that the count of merchants common to the consumers C1 and C2 has increased from one to two. Similarly, the weight of the edge $E_{10}$ is modified from '2' to '3' to indicate that the count of consumers common to the merchants M1 and M2 has increased from two to three. The modified or newly formed edges are shown by dashed lines in FIG. 5B. The fraud detection server 110 retains the weights of those edges $E_1$-$E_6$ and $E_8$ that are not affected by the second transaction.

In one embodiment, upon formation of the new edge $E_{11}$ in the cluster $CL_1$ and the modification of the weights of the edges $E_7$, $E_9$, and $E_{10}$ in the cluster $CL_1$, the fraud detection server 110 updates the embedding 502a of the cluster $CL_1$ to obtain an updated embedding 502b. The addition of the new edge $E_{11}$ and the modification of the weight of the edges $E_7$, $E_9$, and $E_{10}$ in the cluster $CL_1$ may further cause the fraud detection server 110 to update the embeddings 308a, 308b, 308d, 308e, and 308f of the associated nodes $N_{M1}$, $N_{M2}$, $N_{C1}$ $N_{C2}$, and $N_{C3}$. Prior to updating the embeddings 308a, 308b, and 308d-308f of the respective nodes $N_{M1}$, $N_{M2}$, and $N_{C1}$-$N_{C3}$, the fraud detection server 110 compares the previous embedding 502a and the updated embedding 502b of the cluster $CL_1$ to observe the difference therebetween. In one scenario, when the difference between the updated embedding 502b and the previous embedding 502a is less than the first threshold value, the fraud detection server 110 may not update the embeddings 308a, 308b, and 308d-308f of the respective nodes $N_{M1}$, $N_{M2}$, and $N_{C1}$-$N_{C3}$.

In another scenario, when the difference between the updated embedding 502b and the previous embedding 502a is greater than or equal to the first threshold value, the fraud detection server 110 may update the embeddings 308a, 308b, and 308d-308f of the respective nodes $N_{M1}$, $N_{M2}$, and $N_{C1}$-$N_{C3}$. In another scenario, the fraud detection server 110 may only update embeddings of those dominant nodes of the cluster $CL_1$ that are associated with the new edge $E_{11}$ or the edges $E_7$, $E_9$, and $E_{10}$. In the present scenario, since the consumer node $N_{C1}$ is the dominant node for the cluster $CL_1$ and is also associated with the new edge $E_{11}$ and the edges $E_7$ and $E_9$, the fraud detection server 110 updates the embedding 308d of the consumer node $N_{C1}$ to obtain an updated embedding 502c for the consumer node $N_{C1}$.

In a non-limiting example, it is assumed that the fraud detection server 110 only obtains the updated embeddings 502b and 502c for the cluster $CL_1$ and the consumer node $N_{C1}$, respectively. In other words, at the time-instance T=t+2, the fraud detection server 110 updates the embeddings 308a-308g, 502a, and 308i (i.e., the plurality of dynamic features) based on the addition of the new edge $E_{11}$ and the modification in the weights of the edges $E_7$, $E_9$, and $E_{10}$ to obtain the updated embeddings 308a-308c, 502c, 308e-308g, 502b, and 308i (i.e., the updated plurality of dynamic features at the time-instance T=t+2). New and updated embeddings are shown as dashed boxes in FIG. 5B.

Figure 5C:
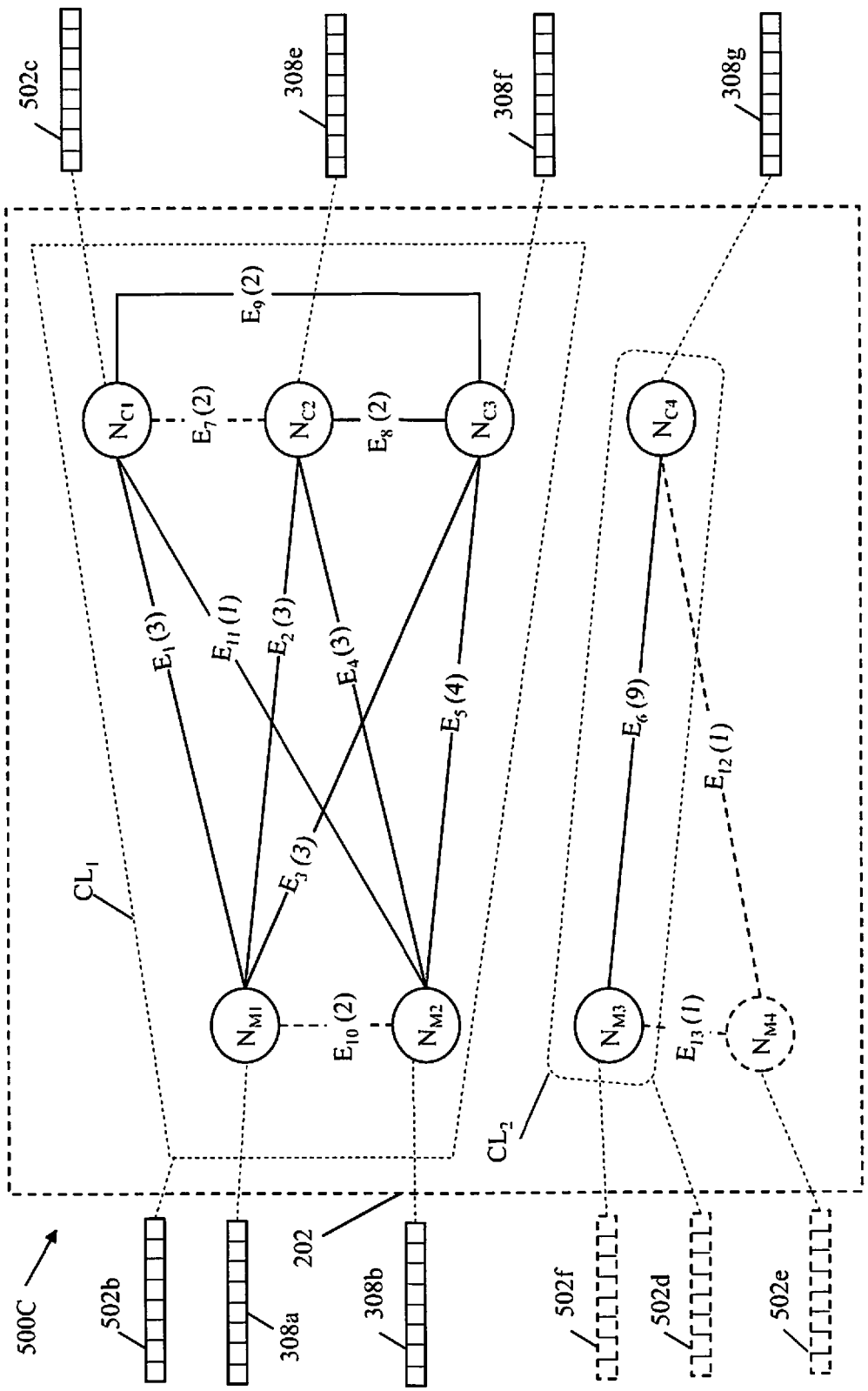

With reference to FIG. 5C, the scenario 500C illustrates an example where the fraud detection server 110 adds a new merchant node in the clustered graph 202. At a time-instance T=t+3, the fraud detection server 110 receives third transaction data of a third transaction. Before the time-instance T=t+3, the plurality of dynamic features include the embeddings 308a-308c, 502c, 308e-308g, 502b, and 308i corresponding to the nodes $N_{M1}$-$N_{M3}$ and $N_{C1}$-$N_{C4}$ and the clusters $CL_1$ and $CL_2$, respectively (as shown in FIG. 5B).

In one example, the third transaction data indicates that the third transaction is executed between a new merchant M4 and the consumer C4. Based on the third transaction data, the fraud detection server 110 identifies that the third transaction is associated with the cluster $CL_2$ as the consumer C4 involved in the third transaction is associated with the cluster $CL_2$ by way of the consumer node $N_{C4}$.

Since the merchant M4 is new, the fraud detection server 110 determines that no node has been assigned to the merchant M4 in the clustered graph 202. In such a scenario, the fraud detection server 110 adds a new merchant node $N_{M4}$ corresponding to the merchant M4 in the clustered graph 202 and forms a new edge $E_{12}$ to connect the new merchant node $N_{M4}$ and the consumer node $N_{C4}$. Since the merchant M4 and the consumer C4 are transacting for the first time by way of the third transaction, the fraud detection server 110 assigns a weight '1' to the edge $E_{12}$. The addition of the new merchant node $N_{M4}$ further causes the fraud detection server 110 to form one or more additional new edges linked to the new merchant node $N_{M4}$. For example, the fraud detection server 110 forms another new edge $E_{13}$ between the new merchant node $N_{M4}$ and the existing merchant node $N_{M3}$ to indicate a count of consumers common to the new merchant M4 and the existing merchant M3.

The modified or newly formed edges are shown by dashed lines and the newly added node is shown by a dashed circle in FIG. 5C. The fraud detection server 110 retains the weights of those edges $E_1$-$E_{11}$ that are not affected by the third transaction or the addition of the new merchant node $N_{M4}$. After the addition of the new merchant node $N_{M4}$, the fraud detection server 110 identifies a cluster for classifying the new merchant node $N_{M4}$. In one embodiment, the fraud detection server 110 may classify the new merchant node $N_{M4}$ in a new cluster. In another embodiment, the fraud detection server 110 may classify the new merchant node $N_{M4}$ in an existing cluster, such as cluster $CL_2$. The fraud detection server 110 may implement Markov clustering technique (as described in the foregoing description of FIG. 2B) again to classify the new merchant node $N_{M4}$ into a cluster. For illustrative purpose, the new merchant node $N_{M4}$ is shown to be classified into the cluster $CL_2$ in FIG. 5D.

In one embodiment, upon addition of the new merchant node $N_{M4}$ to the cluster $CL_2$ and formation of the new edges $E_{12}$ and $E_{13}$ in the cluster $CL_2$, the fraud detection server 110 updates the embedding 308i of the cluster $CL_2$ to obtain an updated embedding 502d. The fraud detection server 110 further determines a new embedding 502e (i.e., a new dynamic feature) for the new merchant node $N_{M4}$. The fraud detection server 110 may utilize Node2vec technique as described in conjunction with FIG. 3A to determine the new embedding 502e for the new merchant node $N_{M4}$. The addition of the new merchant node $N_{M4}$ and formation of the new edges $E_{12}$ and $E_{13}$ in the cluster $CL_2$ may further cause the fraud detection server 110 to update the embeddings 308c and 308g of the respective nodes $N_{M3}$ and $N_{C4}$ associated with the new edges $E_{12}$ and $E_{13}$. Prior to updating the embeddings 308c and 308g, the fraud detection server 110 compares the previous embedding 308i and the updated embedding 502d of the cluster $CL_2$ to observe the difference therebetween. In one scenario, when the difference between the updated embedding 502d and the previous embedding 308i is greater than or equal to the first threshold value, the fraud detection server 110 may update the embeddings 308c and 308g of the respective nodes $N_{M3}$ and $N_{C4}$ that are affected by the addition of the new merchant node $N_{M4}$ and formation of the new edges $E_{12}$ and $E_{13}$ in the cluster $CL_2$.

In one scenario, when the difference between the updated embedding 502d and the previous embedding 308i is less than the first threshold value, the fraud detection server 110 may only update embeddings of those nodes that are adjacent (i.e., directly connected to) to the new merchant node $N_{M4}$. In another embodiment, the fraud detection server 110 may only update embeddings of those dominant nodes of the cluster $CL_2$ that are adjacent to the new merchant node $N_{M4}$ or are connected to the new edges $E_{12}$ or $E_{13}$. In the present scenario, since the merchant node $N_{M3}$ is the dominant node for the cluster $CL_2$ and is also adjacent to the new merchant node $N_{M4}$, the fraud detection server 110 updates the embedding 308c of the merchant node $N_{M3}$ to obtain an updated embedding 502f for the merchant node $N_{M3}$.

In a non-limiting example, it is assumed that the fraud detection server 110 only obtains the updated embeddings 502d and 502f for the cluster $CL_2$ and the merchant node $N_{M3}$, respectively. In other words, at the time-instance T=t+3, the fraud detection server 110 updates the embeddings 308a-308c, 502c, 308e-308g, 502b, and 308i (i.e., the plurality of dynamic features at the time-instance T=t+2) based on the addition of the new merchant node $N_{M4}$ and formation of the new edges $E_{12}$ and $E_{13}$ to obtain the updated embeddings 308a, 308b, 502f, 502e, 502c, 308e-308g, 502b, and 502d (i.e., updated plurality of dynamic features at the time-instance T=t+3). New and updated embeddings are shown as dashed boxes in FIG. 5C.

Figure 5D:
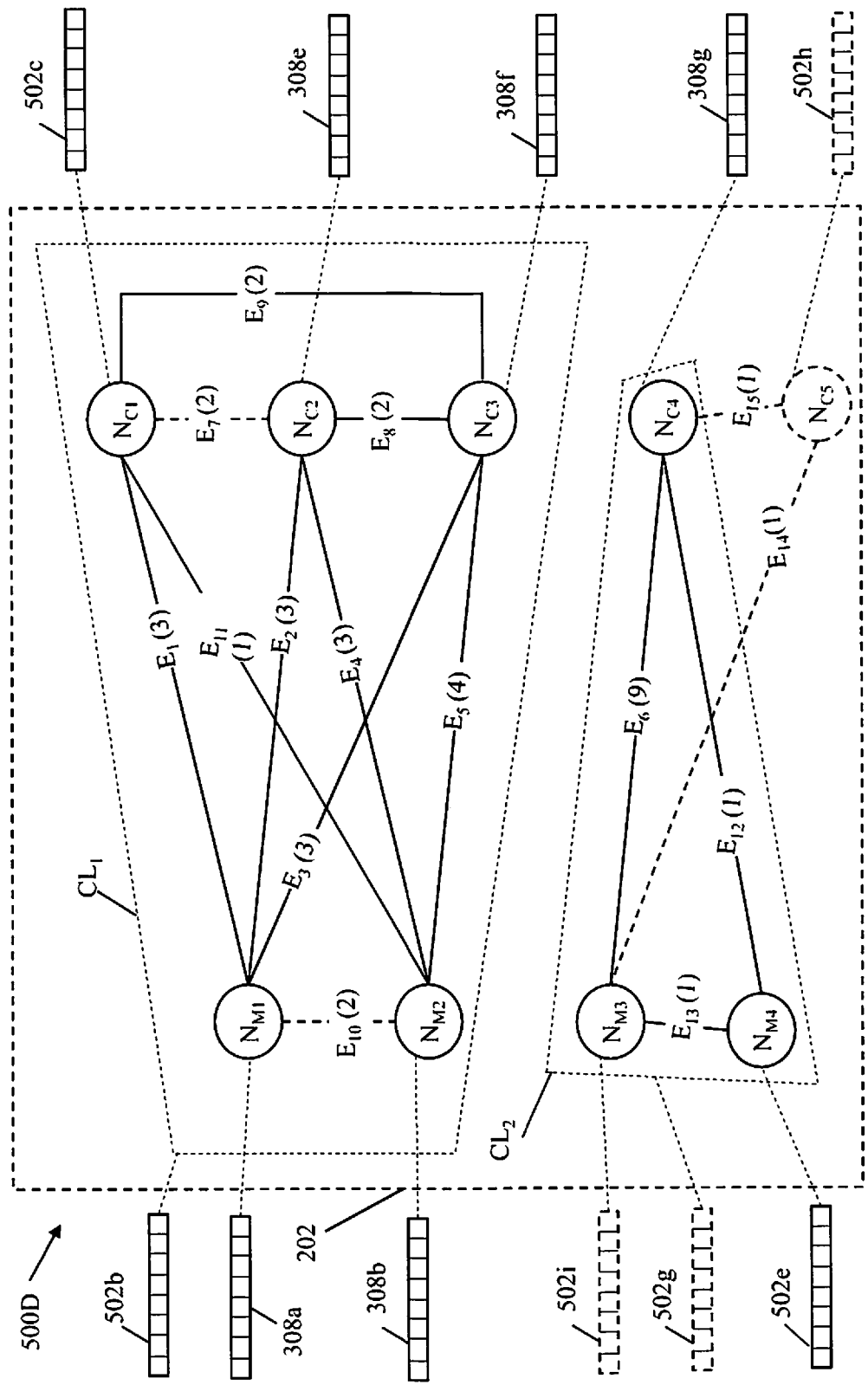

With reference to FIG. 5D, the scenario 500D illustrates an example where the fraud detection server 110 adds a new consumer node in the clustered graph 202. At a time-instance T=t+4, the fraud detection server 110 receives fourth transaction data of a fourth transaction. Before the time-instance T=t+4, the plurality of dynamic features include the embeddings 308a, 308b, 502f, 502e, 502c, 308e-308g, 502b, and 502d corresponding to the nodes $N_{M1}$-$N_{M4}$ and $N_{C1}$-$N_{C4}$ and the clusters $CL_1$ and $CL_2$, respectively (as shown in FIG. 5C).

In one example, the fourth transaction data indicates that the fourth transaction is executed between the merchant M4 and a new consumer C5. Based on the fourth transaction data, the fraud detection server 110 identifies that the fourth transaction is associated with the cluster $CL_2$ as the merchant M4 involved in the fourth transaction is associated with the cluster $CL_2$ by way of the merchant node $N_{M4}$.

Since the consumer C5 is new, the fraud detection server 110 determines that no node has been assigned to the consumer C5 in the clustered graph 202. In such a scenario, the fraud detection server 110 adds a new consumer node $N_{C5}$ corresponding to the consumer C5 in the clustered graph 202 and forms a new edge $E_{14}$ to connect the new consumer node $N_{C5}$ and the merchant node $N_{M4}$. Since the merchant M4 and the consumer C5 have transacted for the first time by way of the fourth transaction, the fraud detection server 110 assigns a weight '1' to the edge $E_{14}$. The addition of the new consumer node $N_{C5}$ further causes the fraud detection server 110 to form one or more additional new edges linked to the new consumer node $N_{C5}$. For example, the fraud detection server 110 forms another new edge $E_{15}$ between the new consumer node $N_{C5}$ and the existing consumer node $N_{C4}$ to indicate a count of merchants (i.e., one) common to the new consumer C5 and the consumer C4.

The modified or newly formed edges are shown by dashed lines and the newly added node is shown by a dashed circle in FIG. 5D. The fraud detection server 110 retains the weights of those edges $E_1$-$E_{13}$ that are not affected by the addition of the new consumer node $N_{C5}$. After the addition of the new consumer node $N_{C5}$, the fraud detection server 110 identifies a cluster for classifying the new consumer node $N_{C5}$. In one embodiment, the fraud detection server 110 may classify the new consumer node $N_{C5}$ in a new cluster. In another embodiment, the fraud detection server 110 may classify the new consumer node $N_{C5}$ in an existing cluster, such as cluster $CL_2$. The fraud detection server 110 may implement Markov clustering technique (as described in the foregoing description of FIG. 2B) again to classify the new consumer node $N_{C5}$ into a cluster.

In one embodiment, upon addition of the new consumer node $N_{C5}$ to the cluster $CL_2$ and formation of the new edges $E_{14}$ and $E_{15}$ in the cluster $CL_2$, the fraud detection server 110 updates the embedding 502d of the cluster $CL_2$ to obtain an updated embedding 502g. The fraud detection server 110 further determines a new embedding 502h (i.e., a new dynamic feature) for the new consumer node $N_{C5}$. The fraud detection server 110 may utilize Node2vec technique as described in conjunction with FIG. 3A to determine the new embedding 502h for the new consumer node $N_{C5}$. The addition of the new consumer node $N_{C5}$ and formation of the new edges $E_{14}$ and $E_{15}$ in the cluster $CL_2$ may further cause the fraud detection server 110 to update the embeddings 502f and 308g of the respective nodes $N_{M3}$ and $N_{C4}$ associated with the new edges $E_{14}$ and $E_{15}$. Prior to updating the embeddings 502f and 308g, the fraud detection server 110 compares the previous embedding 502d and the updated embedding 502g of the cluster $CL_2$ to observe the difference therebetween. In one scenario, when the difference in the updated embedding 502g and the previous embedding 502d is greater than or equal to the first threshold value, the fraud detection server 110 may update the embeddings 502f and 308g of the respective nodes $N_{M3}$ and $N_{C4}$ that are affected by the addition of the new consumer node $N_{C5}$ and formation of the new edges $E_{14}$ and $E_{15}$ in the cluster $CL_2$.

In another scenario, when the difference in the updated embedding 502g and the previous embedding 502d is less than the first threshold value, the fraud detection server 110 may only update embeddings of those nodes that are adjacent to (i.e., directly connected to) the new consumer node $N_{C5}$. In another embodiment, the fraud detection server 110 may only update embeddings of those dominant nodes of the cluster $CL_2$ that are adjacent to the new consumer node $N_{C5}$ or are connected to the new edges $E_{14}$ or $E_{15}$. In the present scenario, since the merchant node $N_{M3}$ is the dominant node for the cluster $CL_2$ and is also adjacent to the new consumer node No, the fraud detection server 110 updates the embedding 502f of the merchant node $N_{M3}$ to obtain an updated embedding 502i for the merchant node $N_{M3}$.

In a non-limiting example, it is assumed that the fraud detection server 110 only obtains the updated embeddings 502g and 502i for the cluster $CL_2$ and the merchant node $N_{M3}$. In other words, at the time-instance T=t+4, the fraud detection server 110 updates the embeddings 308a, 308b, 502f, 502e, 502c, 308e-308g, 502b, and 502d (i.e., the plurality of dynamic features) based on the addition of the new consumer node $N_{C5}$ and formation of the new edges $E_{14}$ and $E_{15}$ to obtain the updated embeddings 308a, 308b, 502i, 502e, 502c, 308e-308g, 502h, 502b, and 502g (i.e., updated plurality of dynamic features at the time-instance T=t+4) corresponding to the nodes $N_{M1}$-$N_{M4}$ and $N_{C1}$-$N_{C5}$ and the clusters $CL_1$ and $CL_2$, respectively. New and updated embeddings are shown as dashed boxes in FIG. 5D.

By observing the difference (or change) between the previous embedding 308h and the updated embedding 502a of the cluster $CL_1$, the fraud detection server 110 selects embeddings (i.e., those dynamic features) that need to be updated. Thus, instead of updating the dynamic features of all the nodes $N_{M1}$-$N_{M3}$ and $N_{C1}$-$N_{C4}$ and all the clusters $CL_1$ and $CL_2$ in the clustered graph 202, the fraud detection server 110 only updates the embeddings of those clusters (e.g., the cluster $CL_1$) and nodes that are associated with the received real-time or near real-time transaction, thereby achieving a low processing time for embedding update.

In another embodiment, a new transaction may be associated with a new merchant and a new consumer for which nodes are not assigned in the clustered graph 202. In such a scenario, the fraud detection server 110 adds a new merchant node and a new consumer node that are connected to each other in the clustered graph 202. The new merchant node and the new consumer node are initially not associated with any cluster. The fraud detection server 110 updates the plurality of dynamic features by adding new dynamic features corresponding to the new merchant node and the new consumer node.

The fraud detection server 110 is further configured to re-train the trained neural network 400 based on the updated embeddings 308a, 308b, 502i, 502e, 308c-308e, 308g, 502h, 502b, and 502g. In one embodiment, the fraud detection server 110 may re-train the neural network 400 after a fixed time interval, for example, one hour, one day, one week, or one month. The time interval for re-training the neural network 400 is defined by the fraud detection server 110 based on the availability of computing resources with the fraud detection server 110, the average count of new transactions being received by the payment network server 106 in the first time interval, the accuracy level, or the like.

Figure 6:
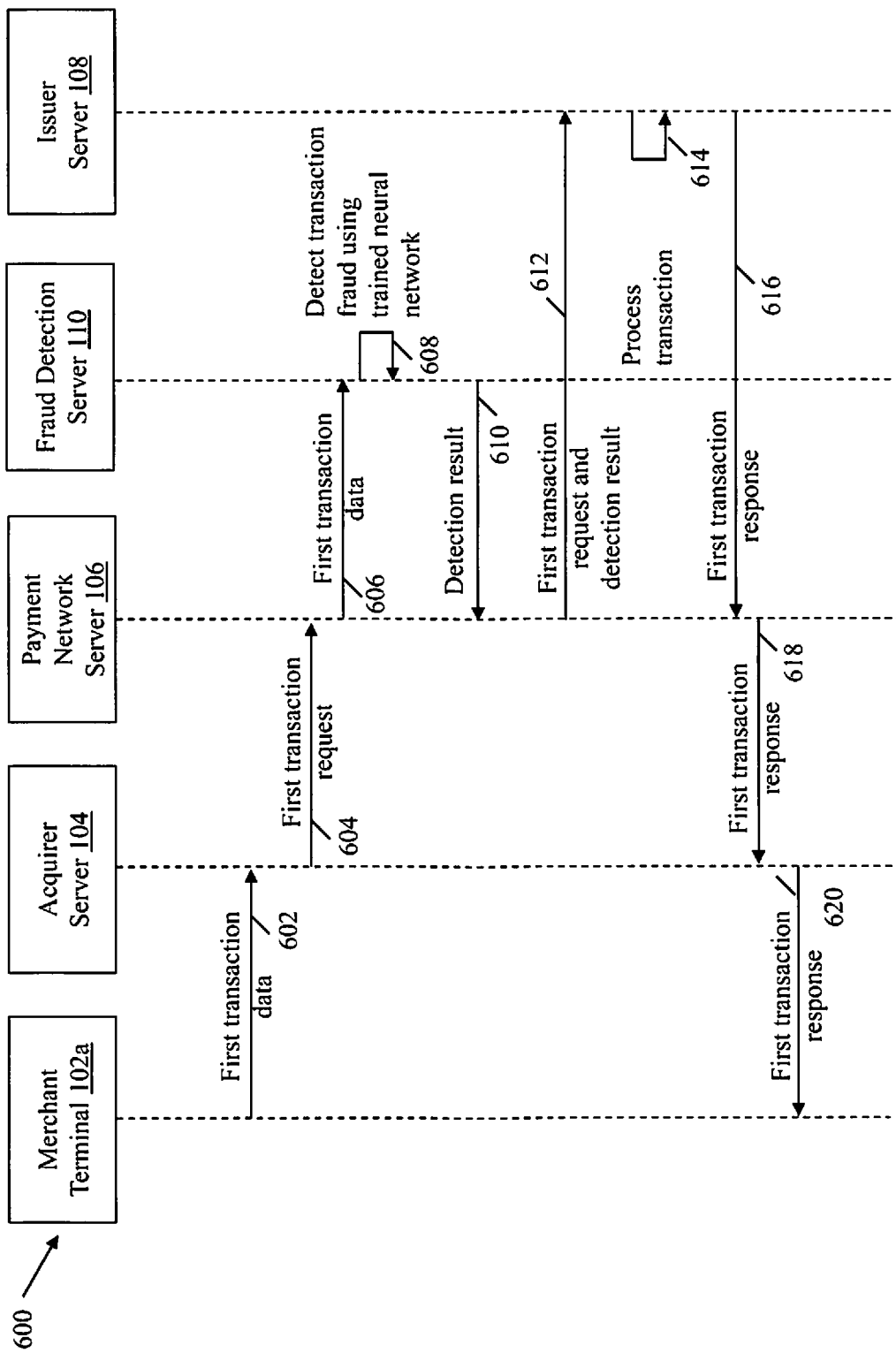
FIG. 6 is a process flow diagram that illustrates detection of fraudulent transactions in real-time or near-real time transactions, in accordance with an embodiment of the present disclosure.

FIG. 6 is a process flow diagram 600 that illustrates detection of fraudulent transactions in real-time or near-real time transactions, in accordance with an embodiment of the present disclosure.

The merchant terminal 102a communicates the first transaction data of the first transaction to the acquirer server 104 (as shown by arrow 602). Based on the first transaction data, the acquirer server 104 communicates a first transaction request to the payment network server 106 (as shown by arrow 604). The first transaction request includes the first transaction data. The payment network server 106 receives the first transaction request from the acquirer server 104 and communicates the first transaction data to the fraud detection server 110 for detecting transaction fraud (as shown by arrow 606). The fraud detection server 110 receives the first transaction data and detects whether the first transaction is a fraudulent transaction based on the predicted output 406 of the trained neural network 400 for the inputted first transaction data (as shown by arrow 608). The fraud detection server 110 communicates the detection result for the first transaction to the payment network server 106 (as shown by arrow 610). The fraud detection server 110 communicates the first transaction request and the detection result to the issuer server 108 for processing the first transaction (as shown by arrow 612).

The issuer server 108 processes the first transaction as per the detection result. In a scenario where the detection result indicates that the first transaction is fraudulent, the issuer server 108 declines the first transaction (as shown by arrow 614). The issuer server 108 communicates a first transaction response indicating a result of processing the first transaction to the payment network server 106 (as shown by arrow 616). The first transaction response indicates whether the first transaction is approved or declined by the issuer server 108. The payment network server 106 further communicates the first transaction response to the merchant terminal 102a by way of the acquirer server 104 (as shown by arrows 618 and 620).

In another embodiment, the first transaction may be declined by the payment network server 106 instead of the issuer server 108 when the detection result indicates that the first transaction is fraudulent. In another embodiment, the first transaction data may be communicated to the fraud detection server 110 by the issuer server 108 instead of the payment network server 106.

FIG. 7A is a schematic diagram that illustrates a second consumer-merchant graph 700 generated by the fraud detection server 110, in accordance with an embodiment of the present disclosure.

The second consumer-merchant graph 700 is another type of consumer-merchant graph generated by the fraud detection server 110 based on the historical transaction data received from one of the payment network server 106 and the issuer server 108. The fraud detection server 110 may utilize one or more graph databases known in the art (e.g., Neo4j, Janus Graph, or the like) to generate the second consumer-merchant graph 700. Similar to the first consumer-merchant graph 200, the second consumer-merchant graph 700 also includes a set of merchant nodes $N_{M5}$-$N_{M6}$ and a set of consumer nodes $N_{C6}$-$N_{C8}$ that are connected by way of different types of weighted edges.

At least one type of weighted edge exists between a merchant node and a consumer node when the historical transaction data indicates that at least one transaction was conducted between corresponding merchant-consumer pair. As shown in FIG. 7A, the merchant node $N_{M5}$ is connected to the consumer node $N_{C6}$ by way of three different edges $A_1$, $D_1$, and $F_1$. The edges $A_1$, $D_1$, and $F_1$ belong to first through third edge types ('A', 'D', and 'F'), respectively. Existence of an edge belonging to the first edge type 'A' between a merchant node and a consumer node implies that at least one approved transaction was executed between a corresponding merchant and a corresponding consumer. The weight of such an edge indicates a count of approved transactions executed between the corresponding merchant and the corresponding consumer. Existence of an edge belonging to the first edge type 'D' between a merchant node and a consumer node implies that least one transaction executed between a corresponding merchant and a corresponding consumer was declined. The weight of such an edge indicates a count of declined transactions between the corresponding merchant and the corresponding consumer. Existence of an edge belonging to the first edge type 'F' between a merchant node and a consumer node implies that least one transaction executed between a corresponding merchant and a corresponding consumer was declined due to fraud. The weight of such an edge indicates a count of transactions between the corresponding merchant and the corresponding consumer that were declined due to fraud.

Thus, the edge $A_1$ having the weight '2' indicates that two transactions executed between the consumer C6 and the merchant M5 were approved. The edge D1 having the weight '3' indicates that three transactions between the consumer C6 and the merchant M5 were declined. The edge F1 having the weight '1' indicates that one transaction executed between the consumer C6 and the merchant M5 was declined due to fraud. The merchant node $N_{M5}$ is connected to the consumer node $N_{C7}$ by way of only one edge $A_2$ belonging to the first edge type 'A' and having the weight '7'. Further, the merchant node $N_{M6}$ is connected to the consumer node $N_{C7}$ by way of only two edges $A_3$ and $F_2$ belonging to the first and third edge types 'A' and 'F', respectively. Absence of the second and third edge types 'D' and 'F' between the merchant node $N_{M5}$ and the consumer node $N_{C7}$ indicates that no transaction between the merchant M5 and the consumer C7 was declined. Absence of the second edge type 'D' between the merchant node $N_{M6}$ and the consumer node $N_{C7}$ indicates that no legitimate transaction between the merchant M6 and the consumer C7 was declined. Similarly, the merchant nodes $N_{M5}$ and $N_{M6}$ are connected to the consumer node $N_{C8}$ based on the historical transactions executed between the consumer C8 and the merchants M5 and M6.

Existence of a weighted edge between two merchant nodes implies that the historical transaction data is indicative of at least one consumer common to merchants corresponding to the two merchant nodes. Since both the merchants M5 and M6 have transacted with the consumer C7, the merchant nodes $N_{M5}$ and $N_{M6}$ are connected by way of the edge $E_{16}$. A weight of an edge between two merchant nodes is indicative of a count of consumers common to the two corresponding merchants. For example, the edge $E_{16}$ having the weight '1' indicates that one consumer (i.e., the consumer C7) is common to the merchants M5 and M6.

Existence of a weighted edge between two consumer nodes implies that the historical transaction data is indicative of at least one merchant common to consumers corresponding to the two consumer nodes. Since both the consumers C7 and C8 have transacted with the merchant M6, the consumer nodes $N_{C7}$ and $N_{C8}$ are connected by way of the edge $E_{17}$. A weight of an edge between two consumer nodes is indicative of a count of merchants common to the two corresponding consumers. For example, the edge $E_{17}$ having a weight '1' indicates that one merchant (i.e., the merchant M6) is common to the consumers C7 and C8.

It will be apparent to a person of ordinary skill in the art that the second consumer-merchant graph 700 is shown for purpose and should not be construed limiting to the scope of the disclosure. In actual implementation, the historical transaction data may be much larger and an actual multi-variate graph generated by the fraud detection server 110 may be more complex in terms of number of nodes and connections between the nodes.

The fraud detection server 110 may utilize the second consumer-merchant graph 700 to train the neural network 400 in a similar manner as explained for the first consumer-merchant graph 200 in the foregoing description of FIGS. 2A, 3A-3B, and 4. Further, the fraud detection server 110 may update the second consumer-merchant graph 700 based on real-time or near real-time transactions in a similar manner as described in the foregoing description of FIGS. 5A-5D.

Prior to determining embeddings for the nodes $N_{M5}$-$N_{M6}$ and $N_{C6}$-$N_{C8}$ in the second consumer-merchant graph 700, the fraud detection server 110 is configured to split the second consumer-merchant graph 700 based on various edge types. An example that illustrates splitting of the second consumer-merchant graph 700 is described in conjunction with FIG. 7B.

Figure 7B:
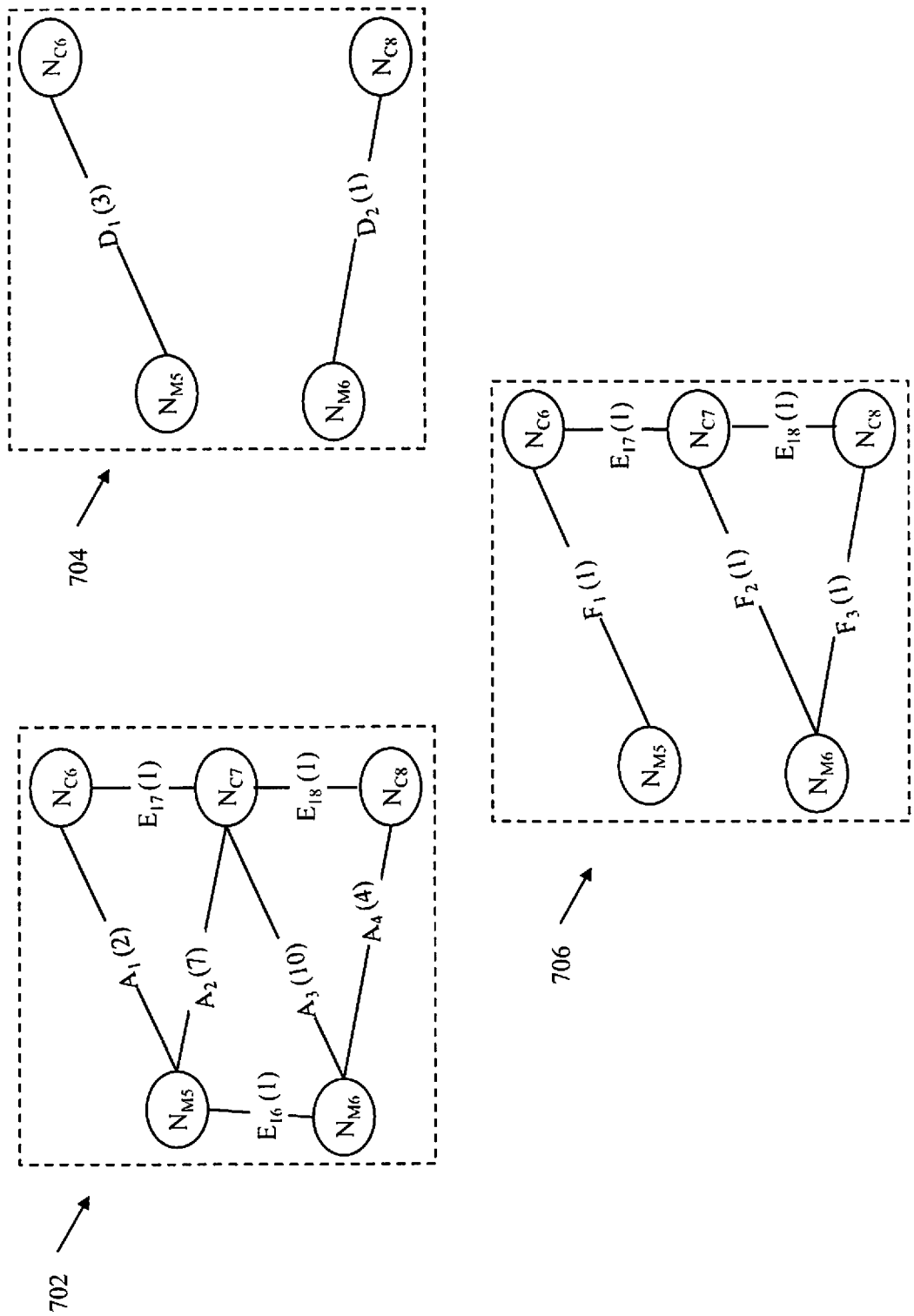
FIG. 7B is a schematic diagram that illustrates first through third sub-graphs obtained by splitting the second consumer-merchant graph of FIG. 7A, in accordance with an embodiment of the present disclosure.

FIG. 7B is a schematic diagram that illustrates first through third sub-graphs 702-706 obtained by splitting the second consumer-merchant graph 700, in accordance with an embodiment of the present disclosure.

The fraud detection server 110 obtains the first through third sub-graphs 702-706 by splitting the second consumer-merchant graph 700 based on the first through third edge types in the second consumer-merchant graph 700. For example, as shown in FIG. 7B, the first sub-graph 702 includes those nodes $N_{M5}$-$N_{M6}$ and $N_{C6}$-$N_{C8}$ of the second consumer-merchant graph 700 that are connected by way of the edges $A_1$-$A_4$ belonging to the first edge type. Similarly, the second sub-graph 704 includes those nodes $N_{M5}$, $N_{M6}$, $N_{C6}$, and $N_{C8}$ of the second consumer-merchant graph 700 that are connected by way of the edges $D_1$ and $D_2$ belonging to the second edge type. Further, the third sub-graph 706 includes those nodes $N_{M5}$-$N_{M6}$ and $N_{C6}$-$N_{C8}$ of the second consumer-merchant graph 700 that are connected by way of the edges $F_1$, $F_2$, and $F_3$ belonging to the third edge type. Upon splitting the second consumer-merchant graph 700 into the first through third sub-graphs 702-706, the fraud detection server 110 utilizes Node2vec technique on each of the first through third sub-graphs 702-706 for determining embeddings of the nodes in each of the first through third sub-graphs 702-706. Since the merchant node $N_{M5}$ is present in the first through third sub-graphs 702-706, three separate embeddings are determined for the merchant node $N_{M5}$. The fraud detection server 110 then concatenates the three separate embeddings of the merchant node $N_{M5}$ to obtain a final embedding of the merchant node $N_{M5}$ such that the final embedding is used in the training of the neural network 400. Similarly, the fraud detection server 110 determines final embeddings of the remaining nodes of the second consumer-merchant graph 700 and trains the neural network 400 for detecting fraudulent transactions.

Figure 8A:
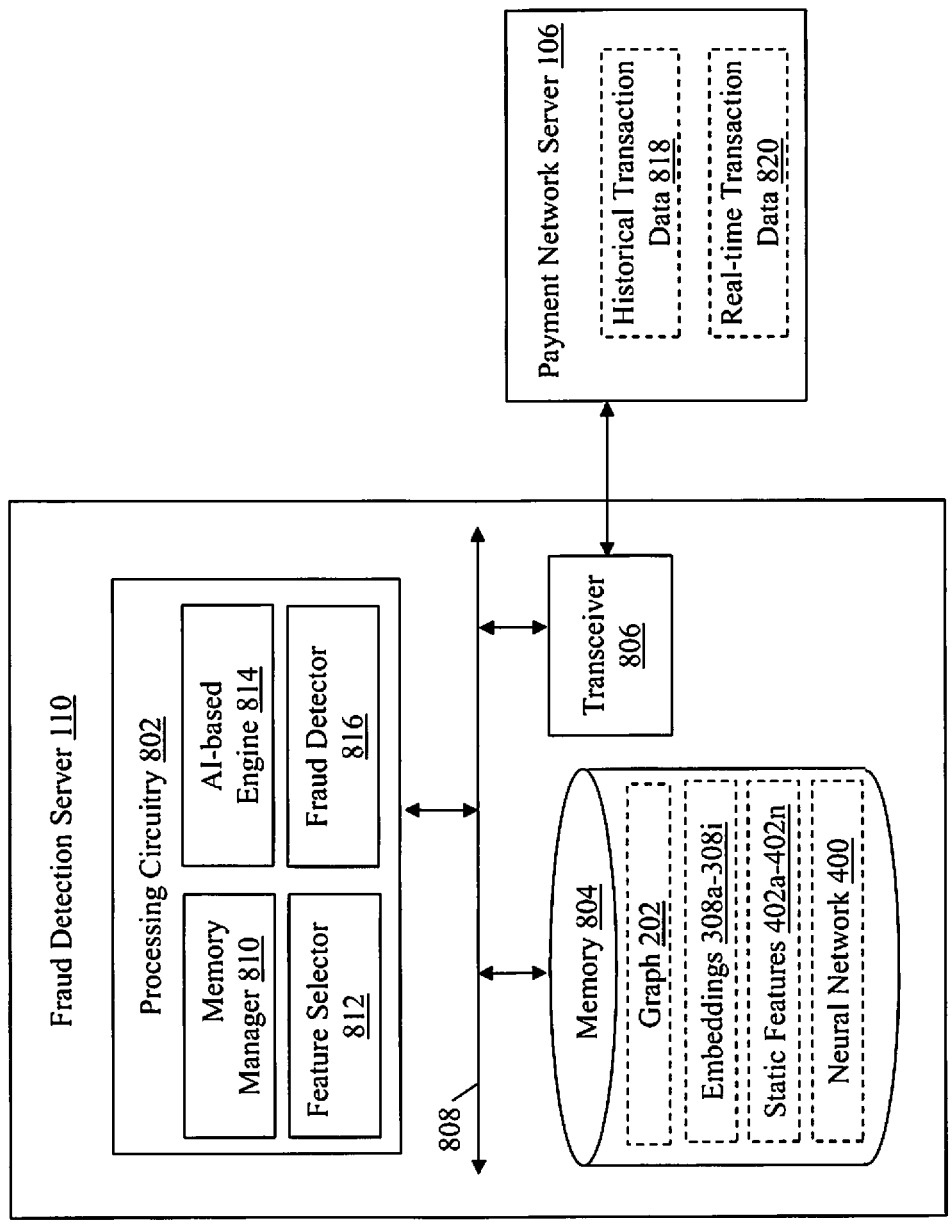
FIG. 8A is a block diagram that illustrates the fraud detection server, in accordance with an embodiment of the present disclosure.

FIG. 8A is a block diagram that illustrates the fraud detection server 110, in accordance with an embodiment of the present disclosure. The fraud detection server 110 may include processing circuitry 802, a memory 804, and a transceiver 806. The processing circuitry 802, the memory 804, and the transceiver 806 may communicate with each other by way of a communication bus 808. The processing circuitry 802 may include a graph generator 810, a feature selector 812, an artificial intelligence (AI)-based engine 814, and a fraud detector 816.

The processing circuitry 802 includes suitable logic, circuitry, interfaces, and/or code for executing a set of instructions stored in a suitable data storage device (for example, the memory 804) to detect fraudulent transactions in electronic transactions. Examples of the processing circuitry 802 may include, but are not limited to, an application-specific integrated circuit (ASIC) processor, a reduced instruction set computer (RISC) processor, a complex instruction set computer (CISC) processor, a field programmable gate array (FPGA), a central processing unit (CPU), or the like. The processing circuitry 802 may execute various operations for detecting fraudulent transactions by way of the graph generator 810, the feature selector 812, the AI-based engine 814, and the fraud detector 816.

The graph generator 810 processes the historical transaction data (hereinafter, the historical transaction data is designated and referred to as "the historical transaction data 818") received from the payment network server 106 to generate the first consumer-merchant graph 200 (or the second consumer-merchant graph 700) as described in conjunction with FIGS. 2A and 7A. The graph generator 810 utilizes one or more graph databases known in the art (e.g., Neo4j, Janus Graph, or the like) to generate the first consumer-merchant graph 200 (or the second consumer-merchant graph 700). The graph generator 810 further utilizes one or mode graph clustering techniques (such as Markov clustering technique, Spectral clustering technique, Affinity propagation technique, or Hierarchical clustering technique) to obtain the clustered graph 202 from the first consumer-merchant graph 200 (or the second consumer-merchant graph 700). The graph generator 810 stores the clustered graph 202 in the memory 804 and updates the clustered graph 202 based on real-time transaction data 820 (or near real-time transaction data) received from the payment network server 106. Various operations performed by the graph generator 810 for updating the clustered graph 202 are described in conjunction with FIGS. 5A-5D.

The feature selector 812 determines the set of static features 402a-402n (as shown in FIG. 4) from the historical transaction data 818 and the plurality of dynamic features (i.e., the embeddings 308a-308i) based on the clustered graph 202. Various operations performed by the feature selector 812 for determining of the static features 402a-402n and the plurality of dynamic features are described in conjunction with FIGS. 3A-3B and 4. Examples of various techniques used by the feature selector 812 to determine the plurality of dynamic features may include DeepWalk, Node2vec, Sub2vec, Graph2vec, Structural Deep Network embedding, or the like. The feature selector 812 stores the set of static features 402a-402n and the plurality of dynamic features (i.e., the embeddings 308a-308i) in the memory 804. The feature selector 812 further updates the static features 402a-402n and the plurality of dynamic features (i.e., the embeddings 308a-308i) based on the real-time transaction data 820 and one or more updates in the clustered graph 202. Various operations performed by the feature selector 812 for determining and updating the set of static features 402a-402n and the plurality of dynamic features are described in conjunction with FIGS. 3A-3B, 4, and 5A-5D.

The AI-based engine 814 trains the neural network 400 by using the set of static features 402a-402n and the plurality of dynamic features (i.e., the embeddings 308a-308i), for detecting fraudulent transactions. The AI-based engine 814 may employ machine learning algorithms, such as supervised, unsupervised, semi-supervised, or reinforcement machine learning algorithms for training the neural network 400. The AI-based engine 814 stores the trained neural network 400 in the memory 804. The AI-based engine 814 further re-trains the neural network 400 after the fixed time interval based on the updates in the set of static features 402a-402n and the plurality of dynamic features (i.e., the embeddings 308a-308i). The AI-based engine 814 may utilize the accuracy level and the availability of computing resources as hyperparameters for defining the fixed time interval to re-train the neural network 400.

The fraud detector 816 utilizes the trained neural network 400 to detect transaction fraud in real-time or near real-time electronic transactions. The fraud detector 816 inputs the real-time transaction data 820 received from the payment network server 106 to the trained neural network 400. The fraud detector 816 then compares the second threshold value with the predicted output 406 generated for the inputted real-time transaction data 820 to detect whether the real-time or near real-time transaction is a legitimate transaction or a fraudulent transaction. The detection result is communicated to the payment network server 106 for processing of the real-time or near real-time transaction.

The memory 804 includes suitable logic, circuitry, and/or interfaces for storing the set of instructions to be executed by the processing circuitry 802 for detecting fraudulent transactions. The memory 804 further stores data that is required by the processing circuitry 802 for executing the set of instructions. For example, the memory 804 stores the clustered graph 202, the embeddings 308a-308i, the set of static features 402a-402n, and the neural network 400. Examples of the memory 804 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 804 in the fraud detection server 110, as described herein. In another embodiment, the memory 804 may be realized in form of a database server or a cloud storage working in conjunction with the fraud detection server 110, without departing from the scope of the disclosure.

The transceiver 806 may include suitable logic, circuitry, interfaces, and/or code, executable by the circuitry, to transmit and receive data over the communication network 116 using one or more communication network protocols. The transceiver 806 may transmit messages to and receive messages from the payment network server 106. For example, the transceiver 806 receives the historical transaction data 818 and the real-time transaction data 820 from the payment network server 106 and transmits the detection result to the payment network server 106. The payment network server 106 processes the corresponding transaction based on the detection result. Examples of the transceiver 806 may include, but are not limited to, an antenna, a radio frequency transceiver, a wireless transceiver, a Bluetooth transceiver, an ethernet port, or any other device configured to transmit and receive data.

It will be apparent to a person of ordinary skill in the art that the scope of the present disclosure is not limited to realizing the payment network server 106 and the fraud detection server 110 as separate entities. In another embodiment, the functionalities and the components of the fraud detection server 110 can be integrated into the payment network server 106, without deviating from the scope of the disclosure. In such a scenario, the payment network server 106 is integrated with the fraud detection server 110 for detecting fraudulent transactions.

Figure 8B:
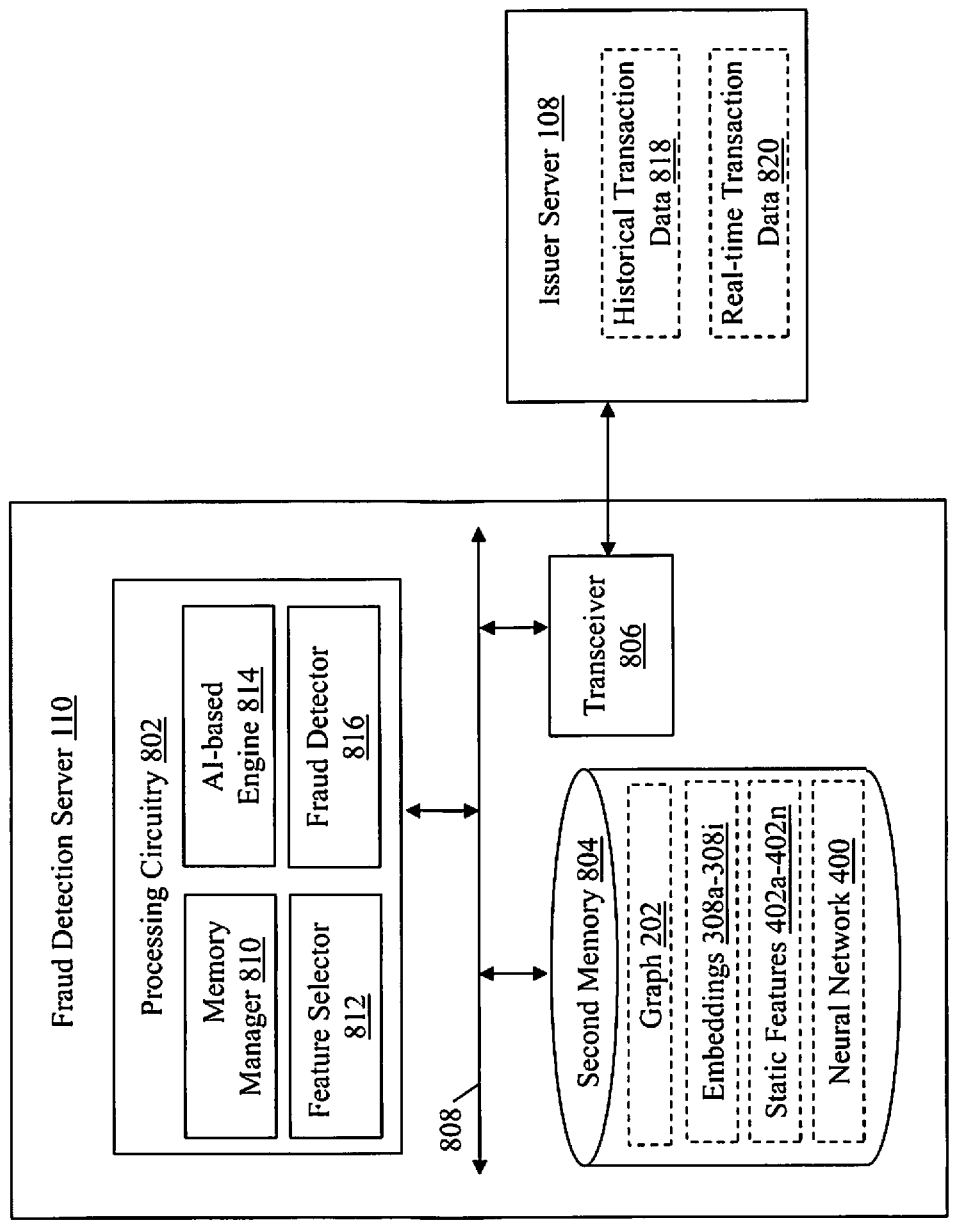
FIG. 8B is a block diagram that illustrates the fraud detection server, in accordance with another embodiment of the present disclosure.

FIG. 8B is a block diagram that illustrates the fraud detection server 110, in accordance with another embodiment of the present disclosure. The fraud detection server 110 shown in FIG. 8B is same as the fraud detection server 110 shown in FIG. 8A. The fraud detection server 110 includes the processing circuitry 802, the memory 804, the transceiver 806, and the communication bus 808 as described in FIG. 8A. The processing circuitry 802 includes the graph generator 810, the feature selector 812, the AI-based engine 814, and the fraud detector 816 as described in FIG. 8A.

In the current embodiment, the transceiver 806 receives the historical transaction data 818 and the real-time transaction data 820 from the issuer server 108 and communicates the detection result to the issuer server 108. The issuer server 108 processes the corresponding transaction based on the detection result. It will be apparent to a person of ordinary skill in the art that the scope of the present disclosure is not limited to realizing the issuer server 108 and the fraud detection server 110 as separate entities. In another embodiment, the functionalities and components of the fraud detection server 110 can be integrated into the issuer server 108, without deviating from the scope of the disclosure.

Figure 9:
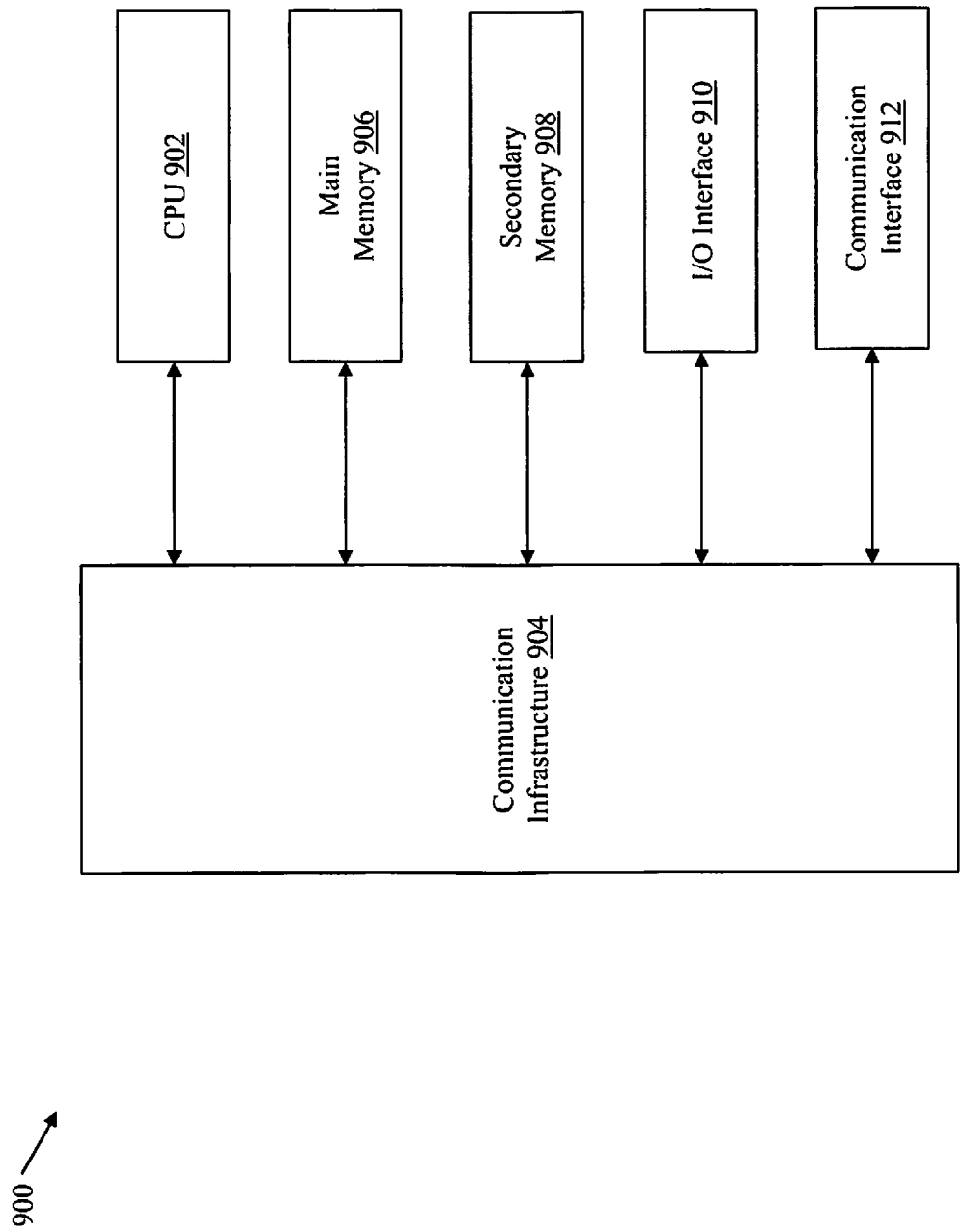
FIG. 9 is a block diagram that illustrates a system architecture of a computer system, in accordance with an embodiment of the present disclosure.

FIG. 9 is a block diagram that illustrates a system architecture of a computer system 900, in accordance with an embodiment of the present disclosure. An embodiment of the present disclosure, or portions thereof, may be implemented as computer readable code on the computer system 900. In one example, the merchant terminals 102a-102n, the acquirer server 104, the payment network server 106, the issuer server 108, and the fraud detection server 110 may be implemented as the computer system 900. Hardware, software, or any combination thereof may embody modules and components used to implement the methods of FIGS. 10A-10C, 11, and 12.

The computer system 900 includes a CPU 902 that may be a special-purpose or a general-purpose processing device. The CPU 902 may be a single processor, multiple processors, or combinations thereof. The CPU 902 may have one or more processor cores. Further, the CPU 902 may be connected to a communication infrastructure 904, such as a bus, message queue, multi-core message-passing scheme, and the like. The computer system 900 may further include a main memory 906 and a secondary memory 908. Examples of the main memory 906 may include RAM, ROM, and the like. The secondary memory 908 may include a hard disk drive or a removable storage drive, such as a floppy disk drive, a magnetic tape drive, a compact disc, an optical disk drive, a flash memory, and the like.

The computer system 900 further includes an input/output (I/O) interface 910 and a communication interface 912. The I/O interface 910 includes various input and output devices that are configured to communicate with the CPU 902. Examples of the input devices may include a keyboard, a mouse, a joystick, a touchscreen, a microphone, and the like. Examples of the output devices may include a display screen, a speaker, headphones, and the like. The communication interface 912 may be configured to allow data to be transferred between the computer system 900 and various devices that are communicatively coupled to the computer system 900. Examples of the communication interface 912 may include a modem, a network interface, i.e., an Ethernet card, a communication port, and the like. Data transferred via the communication interface 912 may correspond to signals, such as electronic, electromagnetic, optical, or other signals as will be apparent to a person skilled in the art.

Figure 10A:
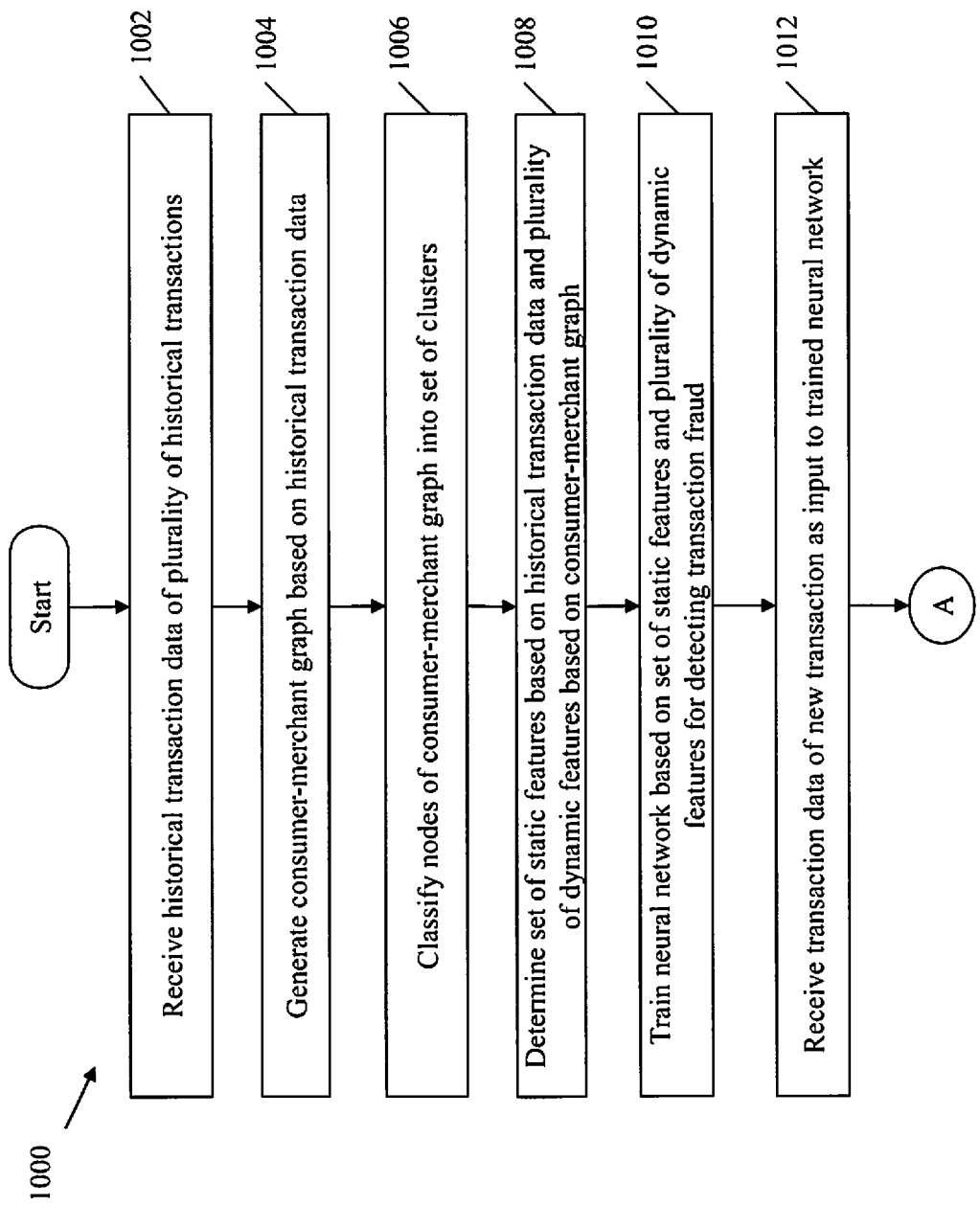
FIGS. 10A-10C, collectively represent a flowchart that illustrates a method for detecting fraudulent transactions, in accordance with an embodiment of the present disclosure.
Figure 10B:
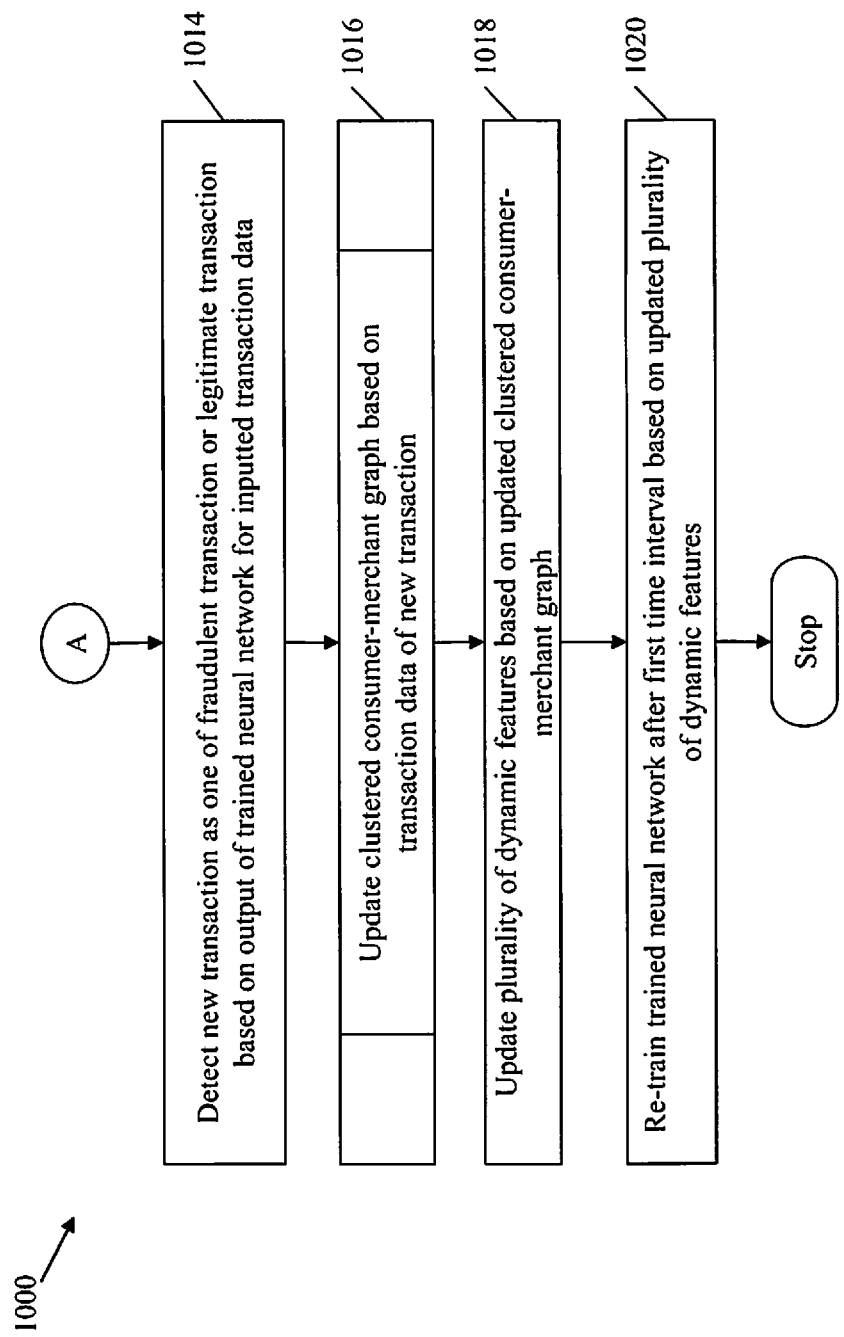
Figure 10C:
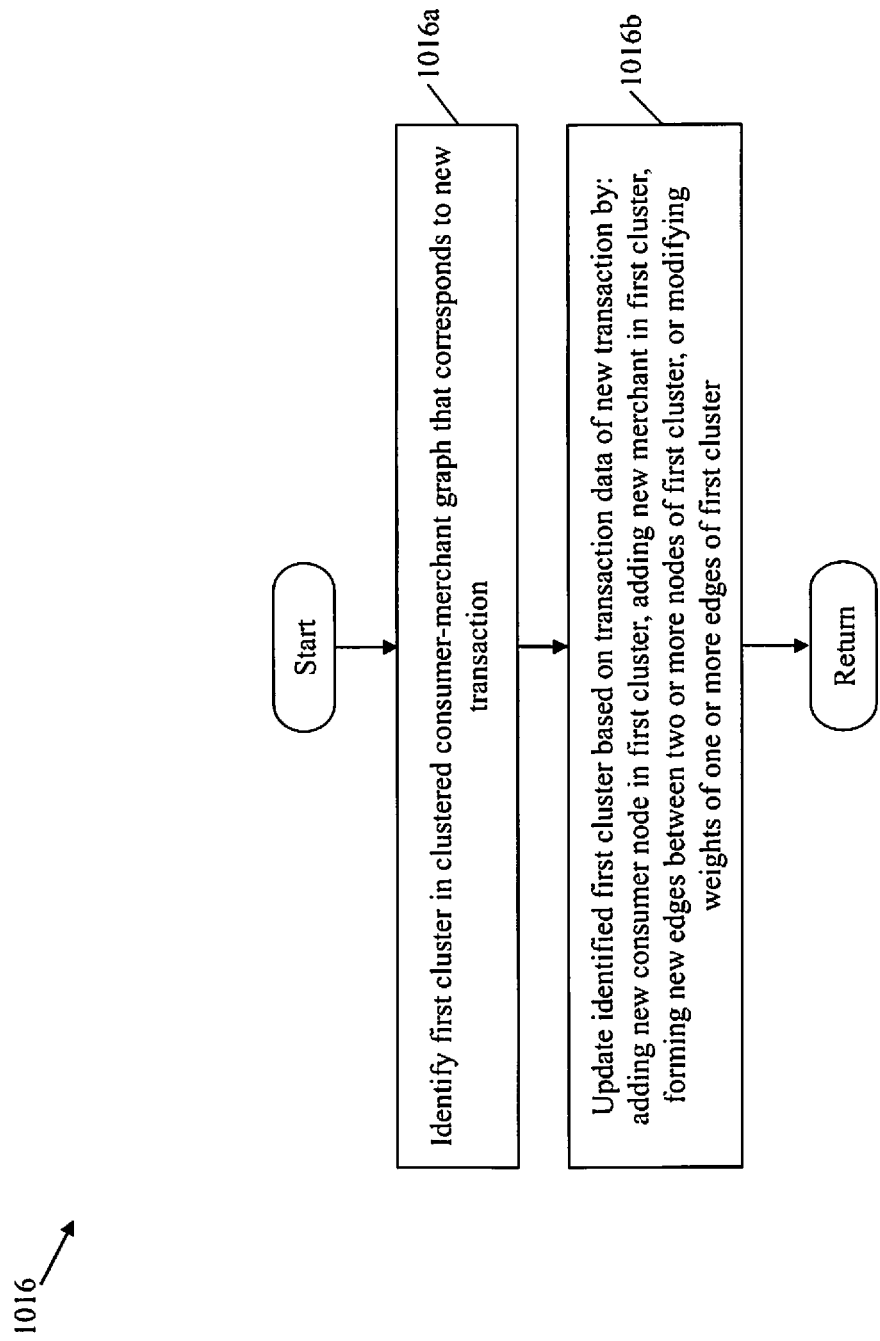

FIGS. 10A-10C, collectively represent a flowchart 1000 that illustrates a method for detecting fraudulent transactions, in accordance with an embodiment of the present disclosure. FIGS. 10A-10C are described in conjunction with FIGS. 2A-2B, 3A-3B, 4, and 5A-5D. For the sake of brevity, the functionalities of training the neural network 400 for detecting transaction fraud and detecting transaction fraud using the trained neural network 400 are shown to be implemented at a single entity (e.g., the fraud detection server 110). However, it will be apparent to a person of ordinary skill in the art that the functionalities of training the neural network 400 and detecting transaction fraud using the trained neural network 400 may be implemented at two separate entities without deviating from the scope of the disclosure.

With reference to FIG. 10A, at step 1002, the fraud detection server 110 receives the historical transaction data 818 of the historical transactions from one of the payment network server 106 or the issuer server 108. The historical transaction data includes information (e.g., various transaction messages) pertaining to the historical transactions executed between the merchants M1-Mn and the consumers C1-Cn. At step 1004, the fraud detection server 110 generates the first consumer-merchant graph 200 based on the historical transaction data 818 (as described in the foregoing description of FIG. 2A). The first consumer-merchant graph 200 includes the merchant nodes $N_{M1}$-$N_{M3}$ and the consumer nodes $N_{C1}$-$N_{C4}$ corresponding to the merchants M1-M3 and the consumers C1-C4, respectively.

The merchant nodes $N_{M1}$-$N_{M3}$ and the consumer nodes $N_{C1}$-$N_{C4}$ are connected to each other by way of the edges $E_1$-$E_{10}$ (as shown in FIG. 2A). At step 1006, the fraud detection server 110 classifies the nodes $N_{M1}$-$N_{M3}$ and $N_{C1}$-$N_{C4}$ of the first consumer-merchant graph 200 into the set of clusters $CL_1$ and $CL_2$ based on the degree of similarity among the nodes $N_{M1}$-$N_{M3}$ and $N_{C1}$-$N_{C4}$. In other words, the fraud detection server 110 segments the first consumer-merchant graph 200 to obtain the clustered graph 202. At step 1008, the fraud detection server 110 determines the set of static features 402a-402n based on the processed historical transaction data and the plurality of dynamic features (e.g., the embeddings 308a-308i) based on the clustered graph 202. Each dynamic feature (i.e., each embedding 308a-308i) represents a corresponding node or a cluster as a point in the d-dimensional embedding space 310 (as described in the foregoing description of FIGS. 3A and 3B).

At step 1010, the fraud detection server 110 trains the neural network 400 based on the set of static features 402a-402n and the plurality of dynamic features (e.g., the embeddings 308a-308i) for detecting fraudulent transactions (as described in the foregoing description of FIG. 4). At step 1012, the fraud detection server 110 receives transaction data (e.g., the real-time transaction data 820) of a new transaction (e.g., the first transaction) as an input to the trained neural network 400.

With reference to FIG. 10B, at step 1014, the fraud detection server 110 detects the new transaction as one of a fraudulent transaction or a legitimate transaction based on the output (e.g., the predicted output 406) of the trained neural network 400 for the inputted transaction data. At step 1016, the fraud detection server 110 updates the clustered graph 202 based on the transaction data of the new transaction. Various operations performed by the fraud detection server 110 to update the clustered graph 202 are explained in conjunction with FIG. 10C.

Referring now to FIG. 10C, at step 1016a, the fraud detection server 110 identifies a first cluster, corresponding to the new transaction, in the clustered graph 202. At step 1016b, the fraud detection server 110 updates the identified first cluster based on the transaction data of the new transaction. The fraud detection server 110 updates the first cluster by adding a new consumer node to the first cluster (as shown in FIG. 5D), adding a new merchant node to the first cluster (as shown in FIG. 5C), forming new edges between two or more nodes in the first cluster (as shown in FIGS. 5B-5D), or modifying the weights of one or more edges of the first cluster (as shown in FIGS. 5A and 5B). The process then returns to step 1018 of FIG. 10B.

Referring back to FIG. 10B, at step 1018, the fraud detection server 110 updates the plurality of dynamic features (i.e., the embeddings 308a-308i) based on the updated clustered graph 202. The fraud detection server 110 updates the plurality of dynamic features by adding one or more new dynamic features corresponding to the new merchant node or the new consumer node added to the first cluster or modifying one or more existing dynamic features in the plurality of dynamic features that correspond to the first cluster, based on the formation of the new edges in the first cluster or the modification in the weights of the one or more edges in the first cluster. For example, as described in the foregoing description of FIGS. 5A-5D, the fraud detection server 110 determines new embeddings 502e and 503h for the new merchant node $N_{M4}$ and the new consumer node $N_{C5}$, respectively, added to the clustered graph 202. Further, the fraud detection server 110 modifies the embedding 308d to the embedding 502c for the consumer node $N_{C1}$ in the cluster $CL_1$ based on the formation of the new edge $E_{11}$ and the modification in the weight of the existing edges $E_7$ and $E_9$ in the cluster $CL_1$.

At step 1020, the fraud detection server 110 re-trains the trained neural network 400 after the fixed time-interval, based on the updated plurality of dynamic features (e.g., the updated embeddings 308a, 308b, 502i, 502e, 308c-308e, 308g, 502h, 502b, and 502g). The re-trained neural network 400 is utilized by the fraud detection server 110 for detecting transaction fraud in one or more subsequent transactions. In other words, each subsequent transaction is detected as one of a fraudulent transaction or a legitimate transaction based on the predicted output 406 of the re-trained neural network 400.

Figure 11:
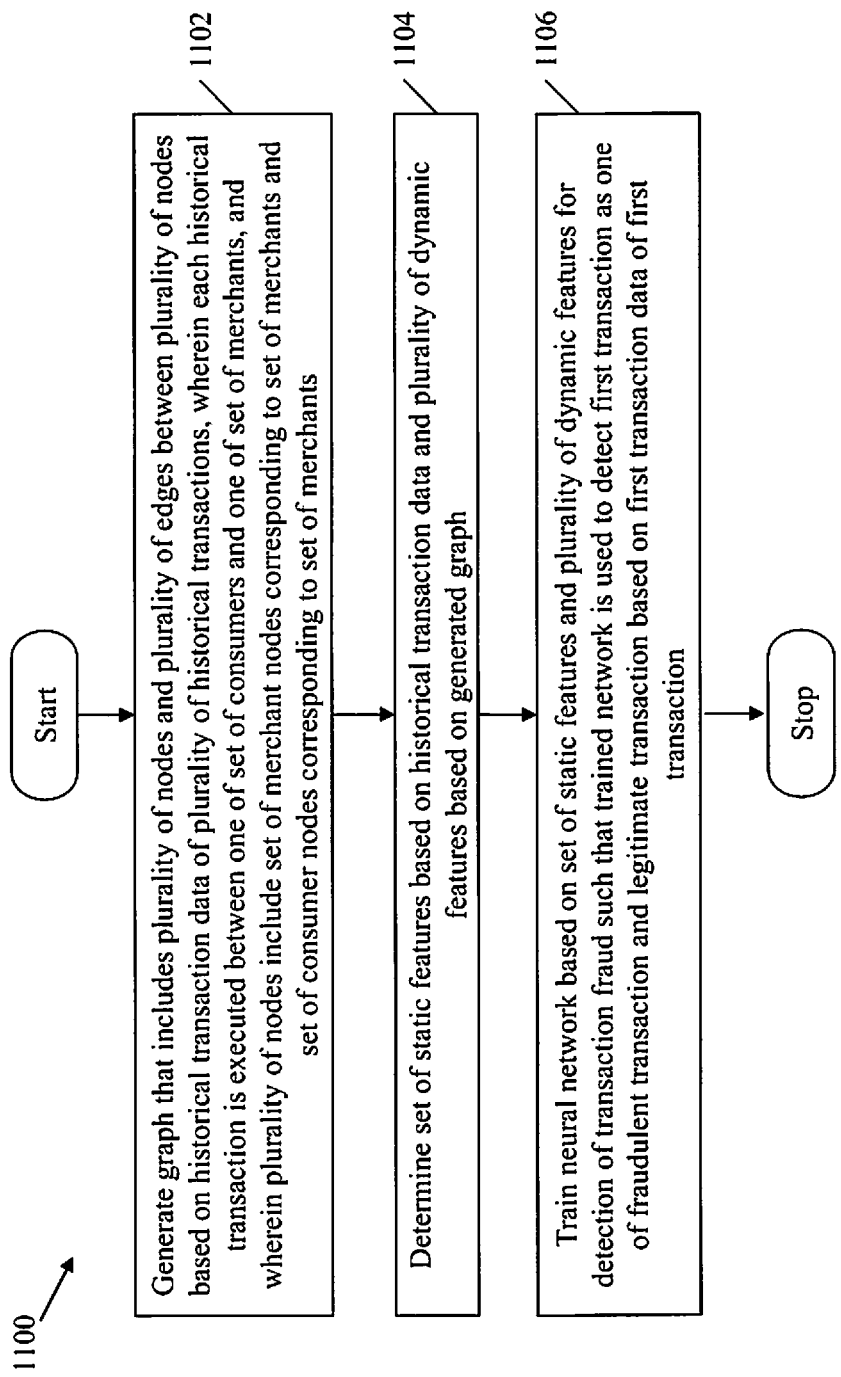
FIG. 11 is a high-level flow chart that illustrates a method for detecting fraudulent transactions, in accordance with an embodiment of the present disclosure.

FIG. 11 is a high-level flowchart 1100 that illustrates a method for detecting fraudulent transactions, in accordance with an embodiment of the present disclosure.

At step 1102, the fraud detection server 110 generates a graph (e.g., the first consumer-merchant graph 200 or the second consumer-merchant graph 700) including the plurality of nodes $N_{M1}$-$N_{M3}$ and $N_{C1}$-$N_{C4}$ and the plurality of edges $E_1$-$E_{10}$ between the plurality of nodes $N_{M1}$-$N_{M3}$ and $N_{C1}$-$N_{C4}$, based on the historical transaction data 818 of the plurality of historical transactions. Each historical transaction is executed between a consumer of the set of consumers C1-CN and a merchant of the set of merchants $M_1$-$M_n$. The plurality of nodes $N_{M1}$-$N_{M3}$ and $N_{C1}$-$N_{C4}$ include the set of merchant nodes $N_{M1}$-$N_{M3}$ corresponding to the set of merchants M1-M3 and the set of consumer nodes $N_{C1}$-$N_{C4}$ corresponding to the set of consumers C1-C4 (as shown in FIG. 2A). At step 1104, the fraud detection server 110 determines the set of static features 402a-402n based on the historical transaction data and the plurality of dynamic features (e.g., the embeddings 308a-308i) based on the generated graph 200. At step 1106, the fraud detection server 110 trains the neural network 400 based on the set of static features 402a-402n and the plurality of dynamic features (e.g., the embeddings 308a-308i), for detection of transaction fraud (as described in the foregoing description of FIG. 4). The trained neural network 400 is used to detect a first transaction as one of a fraudulent transaction or a legitimate transaction based on first transaction data of the first transaction.

Figure 12:
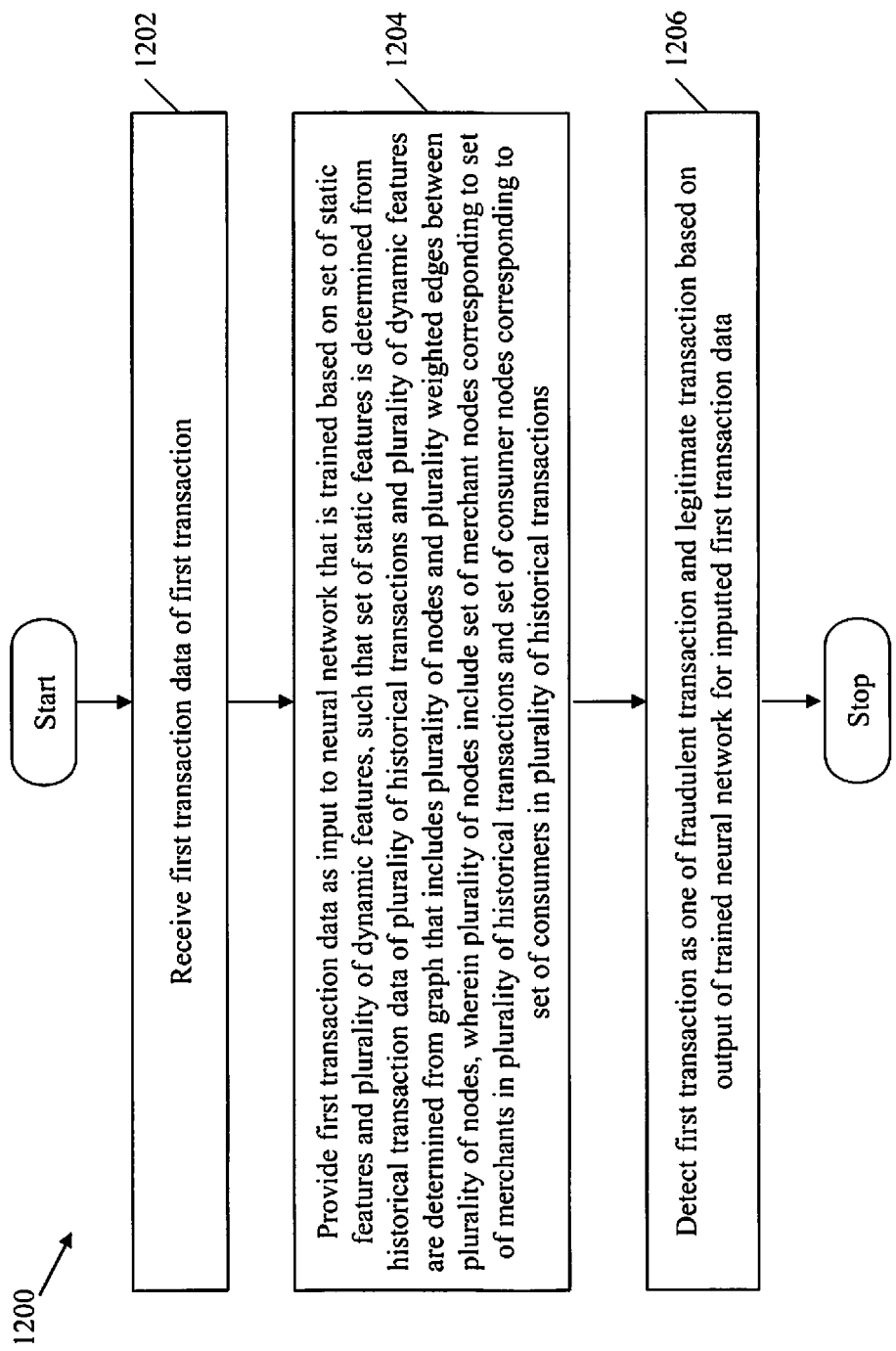
FIG. 12 is a high-level flow chart that illustrates a method for detecting fraudulent transactions using a trained neural network, in accordance with an embodiment of the present disclosure.

FIG. 12 is a high-level flowchart 1200 that illustrates a method for detecting fraudulent transactions using the trained neural network 400, in accordance with an embodiment of the present disclosure.

At step 1202, the fraud detection server 110 receives the first transaction data of the first transaction. The first transaction may be a real-time or near real-time transaction. At step 1204, the fraud detection server 110 provides the first transaction data as input to the neural network 400 that is trained based on the set of static features 402a-402n and the plurality of dynamic features (e.g., the embeddings 308a-308i). The set of static features 402a-402n are determined based on the historical transaction data of the plurality of historical transactions and the plurality of dynamic features (e.g., the embeddings 308a-308i) are determined based on a graph (e.g., the first consumer-merchant graph 200 or the second consumer-merchant graph 700) that includes the plurality of nodes $N_{M1}$-$N_{M3}$ and $N_{C1}$-$N_{C4}$ and the plurality of weighted edges $E_1$-$E_{10}$ between the plurality of nodes $N_{M1}$-$N_{M3}$ and $N_{C1}$-$N_{C4}$. The plurality of nodes $N_{M1}$-$N_{M3}$ and $N_{C1}$-$N_{C4}$ include the set of merchant nodes $N_{M1}$-$N_{M3}$ corresponding to the set of merchants M1-M3 referenced in the plurality of historical transactions and the set of consumer nodes $N_{C1}$-$N_{C4}$ corresponding to the set of consumers C1-C4 referenced in the plurality of historical transactions (as shown in FIG. 2A). At step 1206, the fraud detection server 110 detects the first transaction as one of a fraudulent transaction or a legitimate transaction based on the output of the trained neural network 400 for the inputted first transaction data.

Technological improvements have enabled the fraud detection server 110 to capture dynamic and complex interdependencies (e.g., consumer-merchant dependency) in transaction data and utilize the captured interdependencies for training an AI-based model that detects fraud in real time or near real-time transactions. Since the neural network 400 is trained based on both static and dynamic features, the accuracy and precision of the neural network 400 is higher in comparison to existing AI-based fraud detection models that solely rely on static features. Thus, the fraud detection server 110 provides a robust fraud detection solution to mitigate losses incurred by various transacting parties (such as issuers, consumers, merchants, payment networks, and acquirers) due to fraudulent transactions. The dynamic features typically require frequent updates based on real-time transaction data, which is a resource and time intensive task. Technical improvements in the fraud detection server 110 have enabled the fraud detection server 110 to selectively update the dynamic features based on the availability of computing resources. In order to selectively update the plurality of dynamic features, the fraud detection server 110 initially observes the change caused by real-time transaction data in the dynamic features (i.e., the embeddings) at cluster-level. Only if the change at cluster-level is significant (i.e., greater than the first threshold level), the fraud detection server 110 updates the dynamic features of all the affected nodes. Thus, the select update of the dynamic features reduces the processing time for the fraud detection server 110.

Techniques consistent with the present disclosure provide, among other features, systems and methods for detection of fraudulent transactions. While various embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

We claim:

1. A method for detecting fraudulent transactions, the method comprising:
   generating, by a server, a graph including a plurality of nodes and a plurality of edges between the plurality of nodes based on historical transaction data of a plurality of historical transactions, wherein each historical transaction of the plurality of historical transactions is executed between a consumer of a set of consumers and a merchant of a set of merchants, and wherein the plurality of nodes include a set of merchant nodes corresponding to the set of merchants and a set of consumer nodes corresponding to the set of consumers;
   determining, by the server, a set of static features based on the historical transaction data and a plurality of dynamic features based on the generated graph;
   training, by the server, a neural network based on the set of static features and the plurality of dynamic features, for detection of transaction fraud, wherein the trained neural network is used to detect a first transaction as one of a fraudulent transaction and a legitimate transaction based on first transaction data of the first transaction;
   receiving, by the server, one or more real-time transactions data;
   determining, by the server, that a change in the plurality of dynamic features caused by the one or more real-time transactions data is greater than or equal to a threshold level;
   responsive to the determination that the change in the plurality of dynamic features is greater than or equal to the threshold level:
     updating, by the server, the plurality of dynamic features based on the determination that the change is greater than or equal to the threshold level to limit use of computing resources for the updating only when the change is greater than or equal to the threshold level;
     updating, by the server, the graph based on the updated plurality of dynamic features; and
     retraining, by the server, the neural network based on the updated graph, wherein the neural network is retrained based on the one or more real-time transactions data only when the change in the plurality of dynamic features based on the one or more real-time transactions data is greater than or equal to a threshold level to limit use of computing resources for the retraining.

2. The method of claim 1, wherein the plurality of edges include at least a first edge, a second edge, and a third edge, wherein the first edge is formed between first and second consumer nodes in the generated graph and has a first weight that is indicative of a count of merchants common to first and second consumers that correspond to the first and second consumer nodes, respectively, wherein the second edge is formed between first and second merchant nodes in the generated graph and has a second weight that is indicative of a count of consumers common to first and second merchants that correspond to the first and second merchant nodes, respectively, and wherein the third edge is formed between the first consumer node and the first merchant node and has a third weight that is indicative of a count of historical transactions executed between the first consumer and the first merchant that correspond to the first consumer node and the first merchant node, respectively.

3. The method of claim 1 or claim 2, further comprising classifying, by the server, the plurality of nodes into a set of clusters based on a degree of similarity among the plurality of nodes.

4. The method of claim 3, wherein the plurality of dynamic features include a plurality of embeddings of the plurality of nodes and the set of clusters such that an embedding of the plurality of embeddings represents one of a node of the plurality of nodes and a cluster of the set of clusters as a point in a d-dimensional embedding space, wherein d is an integer greater than two.

5. The method of claim 3, further comprising:
identifying, by the server, a first cluster of the set of clusters that corresponds to the first transaction based on reception of the first transaction data; and
updating, by the server, the identified first cluster based on the first transaction data, wherein updating the first cluster includes at least one of addition of a new consumer node to the first cluster, addition of a new merchant node to the first cluster, modification in one or more weights of one or more edges of the first cluster, and formation of one or more new edges between two or more nodes of the first cluster.

6. The method of claim 5, further comprising updating, by the server, the plurality of dynamic features based on the update of the first cluster, wherein updating the plurality of dynamic features includes at least one of:
adding, by the server, a new dynamic feature to the plurality of dynamic features corresponding to the new merchant node or the new consumer node added to the first cluster, and
modifying, by the server, one or more existing dynamic features of the plurality of dynamic features that correspond to the first cluster, based on the formation of the one or more new edges in the first cluster or the modification in the one or more weights of the one or more edges of the first cluster.

7. A system for detecting fraudulent transactions, the system comprising:
a server configured to:
generate, based on historical transaction data of a plurality of historical transactions, a graph that includes a plurality of nodes and a plurality of edges between the plurality of nodes, wherein each historical transaction of the plurality of historical transactions is executed between a consumer of a set of consumers and a merchant of a set of merchants, and wherein the plurality of nodes include a set of merchant nodes corresponding to the set of merchants and a set of consumer nodes corresponding to the set of consumers;
determine a set of static features based on the historical transaction data and a plurality of dynamic features based on the generated graph;
train a neural network based on the set of static features and the plurality of dynamic features, for detection of transaction fraud, wherein the trained neural network is used to detect a first transaction as one of a fraudulent transaction and a legitimate transaction based on first transaction data of the first transaction;
receive real-time transactions data for one or more new transactions;
determine that a change in the plurality of dynamic features caused by the one or more real-time transactions data is greater than or equal to a threshold level;
responsive to the determination that the change in the plurality of dynamic features is greater than or equal to the threshold level:
update the plurality of dynamic features based on the determination that the change is greater than or equal to the threshold level to limit use of computing resources for the updating only when the change is greater than or equal to the threshold level;
update the graph based on the updated plurality of dynamic features; and
retrain the neural network based on the updated graph.

8. The system of claim 7, wherein the plurality of edges include at least a first edge, a second edge, and a third edge,
wherein the first edge is formed between first and second consumer nodes in the generated graph and has a first weight that is indicative of a count of merchants common to first and second consumers that correspond to the first and second consumer nodes, respectively,
wherein the second edge is formed between first and second merchant nodes in the generated graph and has a second weight that is indicative of a count of consumers common to first and second merchants that correspond to the first and second merchant nodes, respectively, and
wherein the third edge is formed between the first consumer node and the first merchant node and has a third weight that is indicative of a count of historical transactions executed between the first consumer and the first merchant that correspond to the first consumer node and the first merchant node, respectively.

9. The system of claim 7 or claim 8, wherein the server is further configured to classify the plurality of nodes into a set of clusters based on a degree of similarity among the plurality of nodes.

10. The system of claim 9, wherein the server is further configured to:
identify a first cluster of the set of clusters that corresponds to the first transaction upon reception of the first transaction data;
update the identified first cluster based on the first transaction data, wherein the update of the first cluster includes at least one of addition of a new consumer node to the first cluster, addition of a new merchant node to the first cluster, modification in one or more weights of one or more edges of the first cluster, and formation of one or more new edges between two or more nodes of the first cluster; and
update the plurality of dynamic features based on the update of the first cluster, and wherein the update of the plurality of dynamic features includes to at least one of:
addition of a new dynamic features to the plurality of dynamic features corresponding to the new merchant node or the new consumer node added to the first cluster, and
modification of one or more existing dynamic features in the plurality of dynamic features that correspond to the first cluster, based on the formation of the one or more new edges in the first cluster or the modification in the one or more weights of the one or more edges in the first cluster.

11. A method for detecting fraudulent transactions, the method comprising:
receiving, by a server, first transaction data for a first transaction;
providing, by the server, the first transaction data as input to a neural network that is trained based on a set of static features and a plurality of dynamic features, wherein the set of static features is determined from historical transaction data of a plurality of historical transactions and the plurality of dynamic features are determined from a graph that includes a plurality of nodes and a plurality of weighted edges between the plurality of nodes, and wherein the plurality of nodes include a set of merchant nodes corresponding to a set of merchants in the plurality of historical transactions and a set of consumer nodes corresponding to a set of consumers in the plurality of historical transactions;

detecting, by the server, the first transaction as one of a fraudulent transaction and a legitimate transaction based on an output of the trained neural network for the first transaction data;

receiving, by the server, real-time transactions data for one or more new transactions;

determining, by the server, that a change in the plurality of dynamic features caused by the one or more real-time transactions data is greater than or equal to a threshold level;

responsive to the determination that the change in the plurality of dynamic features is greater than or equal to the threshold level:

updating, by the server, the plurality of dynamic features based on the determination that the change is greater than or equal to the threshold level to limit use of computing resources for the updating only when the change is greater than or equal to the threshold level;

updating, by the server, the graph based on the updated plurality of dynamic features; and retraining, by the server, the neural network based on the updated graph.

12. The method of claim 11, wherein the plurality of nodes are clustered into a set of clusters, the method further comprising:

identifying, by the server, a cluster in the set of clusters that corresponds to the first transaction data; and updating, by the server, the identified cluster to reflect the first transaction data.

13. The method of claim 12, wherein updating the identified cluster comprises at least one of: adding a new consumer node to the identified cluster, adding a new merchant node to the identified cluster, forming one or more new edges between two or more existing nodes of the identified cluster, or modifying weights of one or more existing edges in the identified cluster.

14. The method of claim 13, further comprising:

classifying the plurality of nodes into the set of clusters based on a degree of similarity among the plurality of nodes.

15. The method of claim 1, wherein the plurality of edges include at least a first edge, a second edge, and a third edge, and wherein generating the graph comprises:

forming the first edge is between first and second consumer nodes in the generated graph, the first edge having a first weight that is indicative of a count of merchants common to first and second consumers that correspond to the first and second consumer nodes, respectively.

16. The method of claim 1, wherein the plurality of edges include at least a first edge, a second edge, and a third edge, and wherein generating the graph comprises:

forming the second edge between first and second merchant nodes in the generated graph, the second edge having a second weight that is indicative of a count of consumers common to first and second merchants that correspond to the first and second merchant nodes, respectively.

17. The method of claim 1, wherein the plurality of edges include at least a first edge, a second edge, and a third edge, and wherein generating the graph comprises:

forming the third edge between the first consumer node and the first merchant node, the third edge having a third weight that is indicative of a count of historical transactions executed between the first consumer and the first merchant that correspond to the first consumer node and the first merchant node, respectively.

18. The method of claim 1, wherein the neural network is periodically retrained after a fixed time interval has elapsed and wherein retraining the neural network comprises:

determining that the fixed time interval has elapsed since a prior training or retraining; and causing the neural network to be retrained based on the determination that the fixed time interval has elapsed since the prior training or retraining.

19. The method of claim 18, further comprising:

automatically defining the fixed time interval based on an availability of computing resources or an average count of new transactions in a time interval.

20. The method of claim 18, further comprising:

automatically defining the fixed time interval based on an accuracy level required for the neural network.

* * * * *